United States Patent
Ali-Tolppa et al.

(10) Patent No.: US 12,063,230 B2
(45) Date of Patent: *Aug. 13, 2024

(54) TRUST RELATED MANAGEMENT OF ARTIFICIAL INTELLIGENCE OR MACHINE LEARNING PIPELINES

(71) Applicant: Nokia Technologies Oy, Espoo (FI)

(72) Inventors: Janne Ali-Tolppa, Pirkkala (FI); Tejas Subramanya, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 247 days.

This patent is subject to a terminal disclaimer.

(21) Appl. No.: 17/718,552

(22) Filed: Apr. 12, 2022

(65) Prior Publication Data

US 2023/0040284 A1    Feb. 9, 2023

(30) Foreign Application Priority Data

Jul. 27, 2021   (WO) ................. PCT/EP2021/071044

(51) Int. Cl.
*H04L 9/40*    (2022.01)
*H04L 41/16*   (2022.01)

(52) U.S. Cl.
CPC .......... *H04L 63/1416* (2013.01); *H04L 41/16* (2013.01); *H04L 63/126* (2013.01)

(58) Field of Classification Search
None
See application file for complete search history.

(56) References Cited

U.S. PATENT DOCUMENTS 10,664,619 B1 * 5/2020 Marelas ................... G06N 5/01
10,685,347 B1 * 6/2020 Edwards ................. G06F 21/36
(Continued)

FOREIGN PATENT DOCUMENTS

WO       2021/069196 A1      4/2021
WO    WO-2021216104 A1 *   10/2021    ......... G06F 16/2365

OTHER PUBLICATIONS

Han et al.; Evaluating and Improving Adversarial Robustness of Machine Learning-Based Network Intrusion Detectors; IEEE (Year: 2021).*

(Continued)

*Primary Examiner* — Kambiz Zand
*Assistant Examiner* — Mahabub S Ahmed
(74) *Attorney, Agent, or Firm* — SQUIRE PATTON BOGGS (US) LLP

(57) ABSTRACT

There are provided measures for trust related management of artificial intelligence or machine learning pipelines. Such measures exemplarily include, at a first network entity managing artificial intelligence or machine learning trustworthiness in a network, transmitting a first artificial intelligence or machine learning trustworthiness related message towards a second network entity managing artificial intelligence or machine learning trustworthiness in an artificial intelligence or machine learning pipeline in the network, and receiving a second artificial intelligence or machine learning trustworthiness related message from the second network entity, where the first artificial intelligence or machine learning trustworthiness related message includes at least one criterion related to an artificial intelligence or machine learning trustworthiness aspect.

20 Claims, 21 Drawing Sheets

(56) References Cited

U.S. PATENT DOCUMENTS

| | | | | |
|---|---|---|---|---|
| 11,113,653 | B2* | 9/2021 | Ghosh | G06Q 10/06393 |
| 11,249,891 | B1* | 2/2022 | Patel-Schneider | G06F 40/47 |
| 11,625,487 | B2* | 4/2023 | Chen | G06N 3/048 |
| | | | | 726/22 |
| 11,681,796 | B2* | 6/2023 | Tran | G06N 3/082 |
| | | | | 726/22 |
| 2013/0138816 | A1* | 5/2013 | Kuo | G06F 9/5011 |
| | | | | 709/226 |
| 2015/0156208 | A1* | 6/2015 | Kirkham | G06F 21/31 |
| | | | | 726/4 |
| 2020/0167480 | A1* | 5/2020 | Bar-El | H04L 63/0421 |
| 2020/0272909 | A1* | 8/2020 | Parmentier | G06N 3/126 |
| 2020/0387833 | A1* | 12/2020 | Kursun | G06N 20/20 |
| 2020/0387836 | A1* | 12/2020 | Nasr-Azadani | G06N 20/20 |
| 2021/0125104 | A1* | 4/2021 | Christiansen | G06N 20/10 |
| 2021/0166080 | A1* | 6/2021 | Podder | G06F 18/217 |
| 2021/0304339 | A1* | 9/2021 | Neelakanta | G06Q 50/205 |
| 2021/0360006 | A1* | 11/2021 | Kim | G06F 21/562 |
| 2022/0141240 | A1* | 5/2022 | Sel | H04L 63/1416 |
| | | | | 726/23 |
| 2022/0329328 | A1* | 10/2022 | Paulraj | H04B 17/11 |
| 2023/0403208 | A1* | 12/2023 | Seo | H04L 41/16 |

OTHER PUBLICATIONS

Nicolae* et al.; Adversarial Robustness Toolbox v1.0.0; from google scholar (Year: 2019).*

Rosenberg, et al.; Adversarial Machine Learning Attacks and Defense Methods in the Cyber Security Domain; ACM (Year: 2021 ).*

Kesarwani at el.; Model Extraction Warning in MLaaS Paradigm; ACM (Year: 2018).*

Xue et al,; Machine Learning Security: Threats, Countermeasures, and Evaluations; IEEE (Year: 2020).*

Gong et al.; Model Extraction Attacks and Defenses on Cloud-Based Machine Learning Models; IEEE (Year: 2020).*

Papernot et al.; Practical Black-Box Attacks against Machine Learning; ACM (Year: 2017).*

Juuti et al.; PRADA: Protecting Against DNN Model Stealing Attacks; IEEE (Year: 2019).*

Evtimov et al.; Robust Physical-World Attacks on Machine Learning Models; from google.com (Year: 2017).*

Robust Physical-World Attacks on Machine Learning Models et al.; IEEE (Year: 2017).*

PCT Application No. PCT/EP2021/062396, "Framework for Trustworthiness", filed on May 11, 2021, pp. 1-35.

"Use containers to Build, Share and Run your applications", docker, Retrieved on Mar. 25, 2022, Webpage available at : https://www.docker.com/resources/what-container/.

"What is Kubeflow?", Kubeflow, Retrieved on Mar. 25, 2022, Webpage available at : https://www.kubeflow.org/#overview.

"Ethics guidelines for trustworthy AI", digital-strategy, European Commission, .Retrieved on Mar. 25, 2022, Webpage available at : https://digital-strategy.ec.europa.eu/en/library/ethics-guidelines-trustworthy-ai.

"Information technology—Artificial intelligence—Overview of trustworthiness in artificial intelligence", Technical Report, ISO/IEC TR 24028, First edition, May 2020, 50 pages.

"AI Fairness 360", IBM Research Trusted AI, Retrieved on Mar. 25, 2022, Webpage available at : https://aif360.mybluemix.net/.

"AI Explainability 360", IBM Research Trusted AI, Retrieved on Mar. 25, 2022, Webpage available at : https://aix360.mybluemix.net/.

"Adversarial Robustness Toolbox", Github, Retrieved on Mar. 25, 2022, Webpage available at : https://github.com/Trusted-AI/adversarial-robustness-toolbox.

"Explainable AI", Google Cloud, Retrieved on Mar. 25, 2022, Webpage available at : https://cloud.google.com/explainable-ai.

"Learn how to integrate Responsible AI practices into your ML workflow using TensorFlow", TensorFlow, Retrieved on Mar. 25, 2022, Webpage available at : https://www.tensorflow.org/responsible_ai.

Hind et al., "TED: Teaching AI to Explain its Decisions", arXiv, Jun. 15, 2019, 7 pages.

"Regulation of The European Parliament and of the Council Laying Down Harmonised Rules on Artificial Intelligence (Artificial Intelligence Act) and Amending Certain Union Legislative Acts", European Commission, Retrieved on Mar. 30, 2022, Webpage available at : https://eur-lex.europa.eu/legal-content/EN/TXT/HTML/?uri=CELEX:52021PC0206&from=EN.

PCT Application No. PCT/EP2021/072357, "Method and apparatus for feasibility checking of AI pipeline Trustworthiness", filed on Aug. 11, 2021, pp. 1-51.

Emmanuel et al., "A survey on missing data in machine learning", Journal of Big Data, vol. 8, No. 1, 2021, pp. 1-37.

Lu et al., "Learning under Concept Drift: A Review", IEEE Transactions on Knowledge and Data Engineering, vol. 31, No. 12, Dec. 1, 2019, pp. 2346-2363.

PCT Application No. PCT/EP2021/081004, "Trust related management of artificial intelligence or machine learning pipelines in relation to adversarial robustness", filed on Nov. 9, 2021, pp. 1-84.

"Data Communication Networks" Information Technology Open System Interconnection Systems Management: State Management Function, ITU-T Recommendation X.731, Jan. 1992, 29 pages.

International Search Report and Written Opinion received for corresponding Patent Cooperation Treaty Application No. PCT/EP2021/071153, dated Mar. 25, 2022, 12 pages.

Li et al., "Trustworthy Deep Learning in 6G-Enabled Mass Autonomy: From Concept to Quality-of-Trust Key Performance Indicators", IEEE Vehicular Technology Magazine, vol. 15, No. 4, Dec. 2020, pp. 112-121.

Spinner et al., "explAIner: A Visual Analytics Framework for Interactive and Explainable Machine Learning", arXiv, Oct. 7, 2019, pp. 1-11.

International Search Report and Written Opinion received for corresponding Patent Cooperation Treaty Application No. PCT/EP2021/071044, dated May 13, 2022, 12 pages.

Toreini et al., "Technologies for Trustworthy Machine Learning: A Survey in a Socio-Technical Context", arXiv, Jul. 17, 2020, pp. 1-32.

* cited by examiner

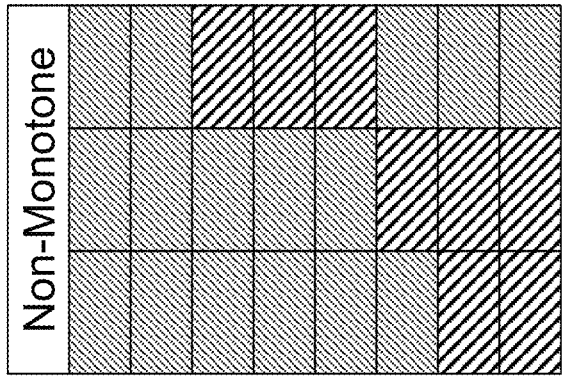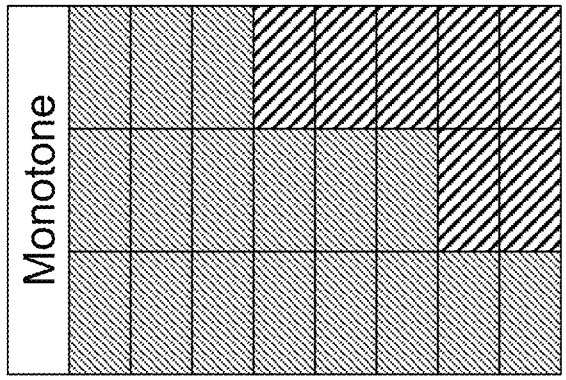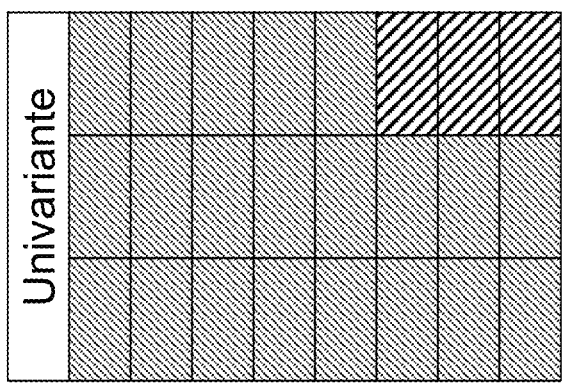
Fig. 14

TRUST RELATED MANAGEMENT OF ARTIFICIAL INTELLIGENCE OR MACHINE LEARNING PIPELINES

FIELD

Various example embodiments relate to trust related management of artificial intelligence or machine learning pipelines and technical robustness aspects. More specifically, various example embodiments exemplarily relate to measures (including methods, apparatuses and computer program products) for realizing trust related management of artificial intelligence or machine learning pipelines.

BACKGROUND

List of Acronyms and Abbreviations

3GPP Third Generation Partnership Project
AI artificial intelligence
AI QoT AI quality of trustworthiness
AN access network
API application programming interface
AUC area under the curve
AV autonomous vehicle
CAN cognitive autonomous network
CN core network
CNF Cognitive Network Function
CRUD create, read, update, and delete
CSMF Communication Service Management Function
ECO edge cloud orchestrator
HLEG High-level Expert Group
IEC International Electrotechnical Commission
IOC Information Object Class
ISO International Organization for Standardization
KPI key performance indicator
MAE mean absolute error
MANO Management and Orchestration
ML machine learning
MOI Manager Object Instance
MSE mean squared error
NRM network resource model
NSMF Network Slice Management Function
NSSMF Network Slice Subnet Management Function
QCI QoS class identifier
QoE quality of experience
QoS quality of service
QoS-PAIP QoS prediction AI pipeline
QoT quality of trustworthiness
RMSE root mean square error
SBMA Service-Based Management Architecture
SLA service level agreement
SMO service management and orchestration
TAI Trustworthy AI
TAIF trustworthy artificial intelligence framework
TED Teaching Explainable Decisions
TN transport network
VNF virtual network function

SUMMARY

Various example embodiments aim at addressing, at least in part, issues and/or problems and drawbacks related to trust related management of artificial intelligence or machine learning pipelines.

Various aspects of example embodiments are set out in the appended claims.

According to an exemplary aspect, there is provided a method of a first network entity managing artificial intelligence or machine learning trustworthiness in a network, the method comprising transmitting a first artificial intelligence or machine learning trustworthiness related message towards a second network entity managing artificial intelligence or machine learning trustworthiness in an artificial intelligence or machine learning pipeline in said network, and receiving a second artificial intelligence or machine learning trustworthiness related message from said second network entity, wherein said first artificial intelligence or machine learning trustworthiness related message includes at least one criterion related to an artificial intelligence or machine learning trustworthiness aspect.

According to an exemplary aspect, there is provided a method of a second network entity managing artificial intelligence or machine learning trustworthiness in an artificial intelligence or machine learning pipeline in a network, the method comprising receiving a first artificial intelligence or machine learning trustworthiness related message from a first network entity managing artificial intelligence or machine learning trustworthiness in said network, and transmitting a second artificial intelligence or machine learning trustworthiness related message towards said first network entity, wherein said first artificial intelligence or machine learning trustworthiness related message includes at least one criterion related to an artificial intelligence or machine learning trustworthiness aspect.

According to an exemplary aspect, there is provided an apparatus of a first network entity managing artificial intelligence or machine learning trustworthiness in a network, the apparatus comprising at least one processor, at least one memory including computer program code, and at least one interface configured for communication with at least another apparatus, the at least one processor, with the at least one memory and the computer program code, being configured to cause the apparatus to perform transmitting a first artificial intelligence or machine learning trustworthiness related message towards a second network entity managing artificial intelligence or machine learning trustworthiness in an artificial intelligence or machine learning pipeline in said network, and receiving a second artificial intelligence or machine learning trustworthiness related message from said second network entity, wherein said first artificial intelligence or machine learning trustworthiness related message includes at least one criterion related to an artificial intelligence or machine learning trustworthiness aspect.

According to an exemplary aspect, there is provided an apparatus of a second network entity managing artificial intelligence or machine learning trustworthiness in an artificial intelligence or machine learning pipeline in a network, the apparatus comprising at least one processor, at least one memory including computer program code, and at least one interface configured for communication with at least another apparatus, the at least one processor, with the at least one memory and the computer program code, being configured to cause the apparatus to perform receiving a first artificial intelligence or machine learning trustworthiness related message from a first network entity managing artificial intelligence or machine learning trustworthiness in said network, and transmitting a second artificial intelligence or machine learning trustworthiness related message towards said first network entity, wherein said first artificial intelligence or machine learning trustworthiness related message includes at least one criterion related to an artificial intelligence or machine learning trustworthiness aspect.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient control and evaluation of trustworthiness of AI/ML models to thereby solve at least part of the problems and drawbacks identified in relation to the prior art.

By way of example embodiments, there is provided trust related management of artificial intelligence or machine learning pipelines. More specifically, by way of example embodiments, there are provided measures and mechanisms for realizing trust related management of artificial intelligence or machine learning pipelines.

Thus, improvement is achieved by methods, apparatuses and computer program products enabling/realizing trust related management of artificial intelligence or machine learning pipelines.

BRIEF DESCRIPTION OF THE DRAWINGS

In the following, the present disclosure will be described in greater detail by way of non-limiting examples with reference to the accompanying drawings, in which FIG. 14 shows a and schematic diagram of different missing data patterns.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) trust related management of artificial intelligence or machine learning pipelines, and in particular measures and mechanisms for (enabling/realizing) operations and notifications for configuring and reporting artificial intelligence trustworthiness on cognitive autonomous networks.

Example embodiments, although not limited to this, relate to artificial intelligence (AI)/machine learning (ML) model trustworthiness in particular for interoperable and multi-vendor environments.

An AI or ML pipeline helps to automate AI/ML workflows by splitting them into independent, reusable and modular components that can then be pipelined together to create a (trained) (AI/ML) model. An AI/ML pipeline is not a one-way flow, i.e., it is iterative, and every step is repeated to continuously improve the accuracy of the model and achieve a successful algorithm.

Figure 9:
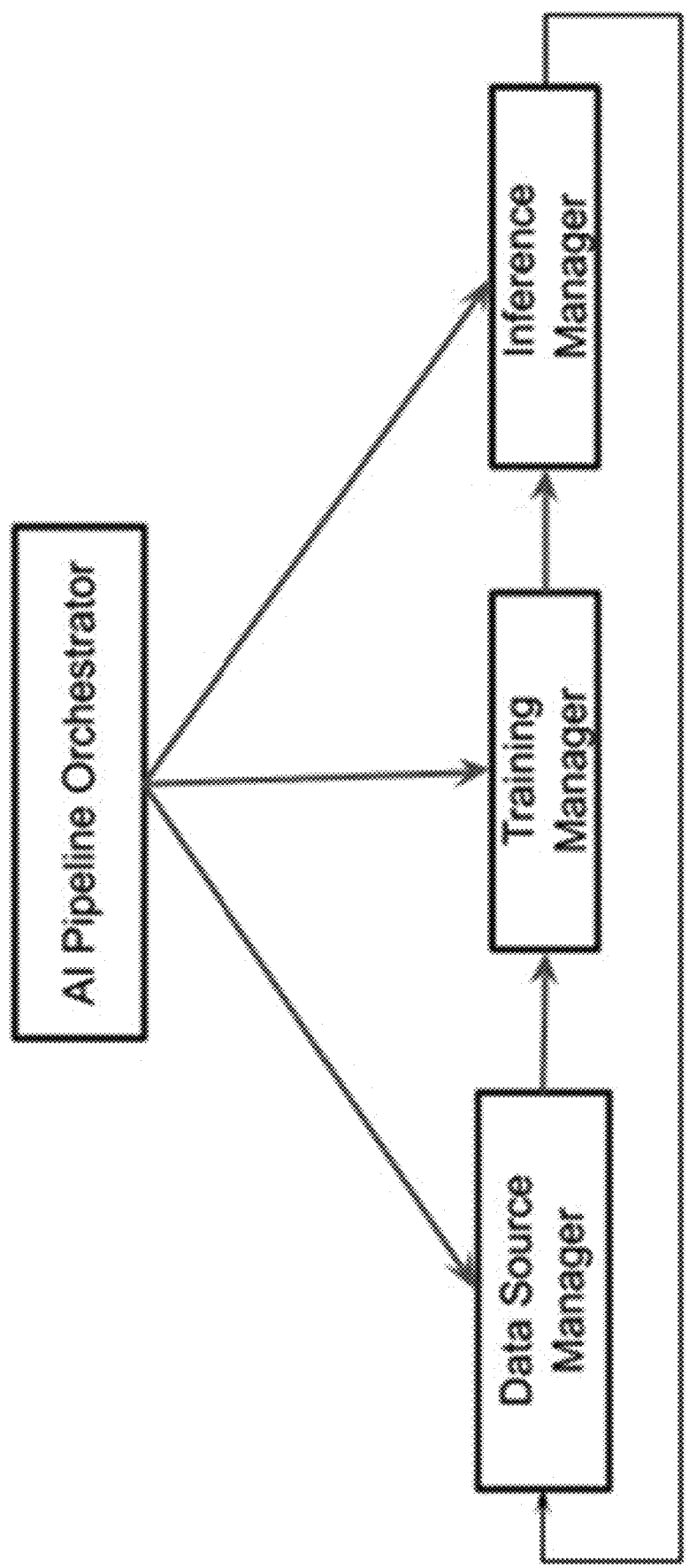
FIG. 9 shows a schematic diagram of an example of an AI/ML pipeline.
Figure 10:
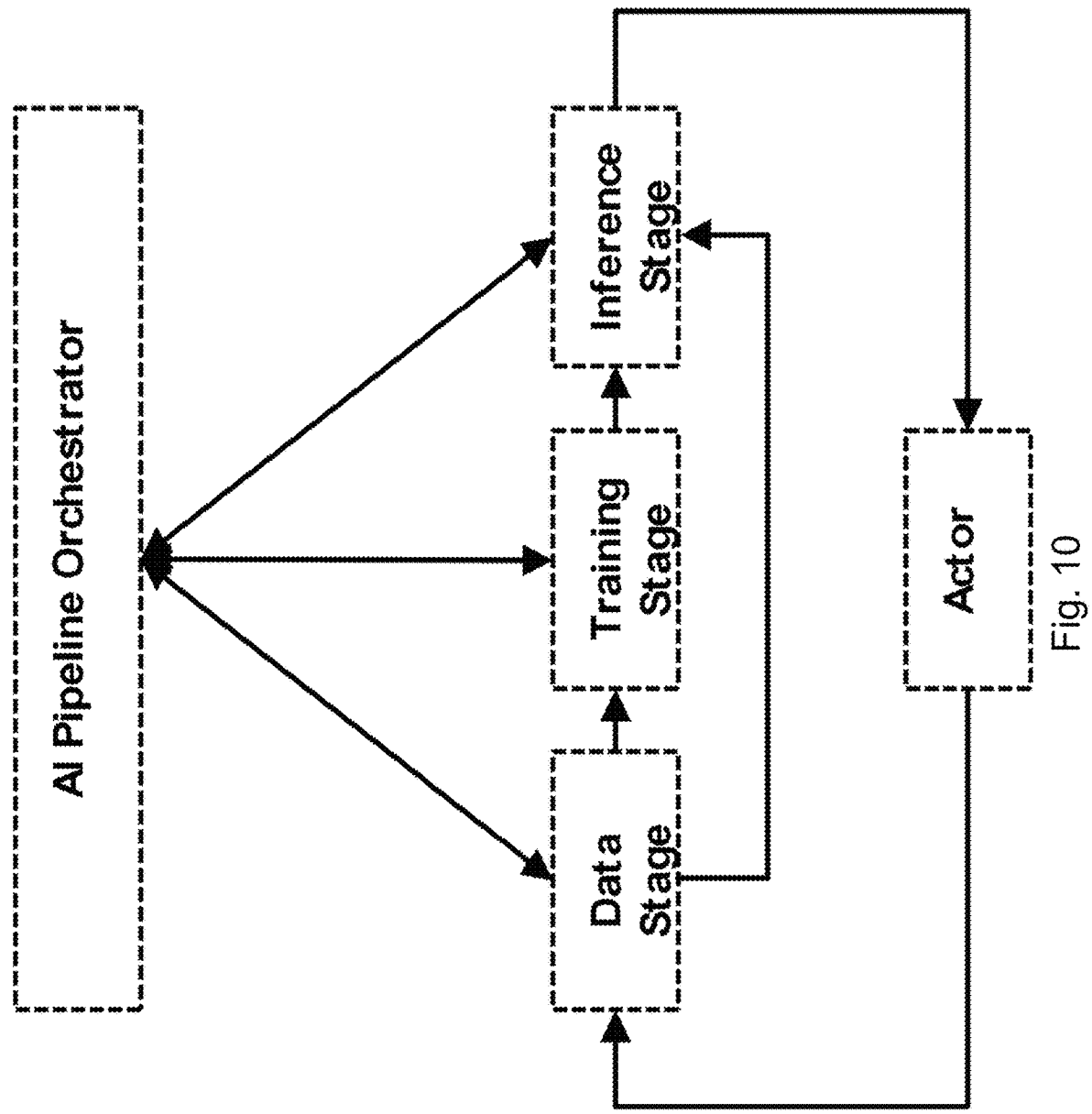
FIG. 10 shows a schematic diagram alternatively illustrating an example of an AI/ML pipeline.

FIG. 9 shows a schematic diagram of an example of an AI/ML pipeline. FIG. 10 shows a schematic diagram alternatively illustrating an example of an AI/ML pipeline.

An AI/ML workflow might consist of at least the following three components illustrated in FIGS. 9 and 10, namely, a data source manager or data stage (e.g., data collection, data preparation/processing), a model training manager or training stage (e.g., hyperparameter tuning), and a model inference manager or inference stage (e.g., model evaluation).

With AI/ML pipelining and the recent push for microservices architectures (e.g., container virtualization), each AI/ML workflow component is abstracted into an independent service that relevant stakeholders (e.g., data engineers, data scientists) can independently work on.

Besides, an AI/ML pipeline orchestrator shown in FIGS. 9 and 10 can manage the AI/ML pipelines' lifecycle (e.g., commissioning, scaling, decommissioning).

Subsequently, some basics of trustworthy artificial intelligence are explained.

For AI/ML systems to be widely accepted, they should be trustworthy in addition to their performance, i.e., in addition to meeting performance requirements (e.g., accuracy). The High-level Expert Group (HLEG) on AI has developed the European Commission's Trustworthy AI (TAI) strategy. In the deliverable 'Ethics Guidelines for Trustworthy AI' released in April 2019, the group has listed seven critical requirements that the AI systems should meet to be considered trustworthy. The European Commission presented the EU Artificial Intelligence Act or the regulatory framework for AI by setting out horizontal rules for the development, commodification and use of AI-driven products, services and systems within the territory of the EU. The Act seeks to codify the high standards of the EU Trustworthy AI paradigm, which requires AI to be legally, ethically and technically robust, while respecting democratic values, human rights and the rule of law. The draft regulation provides corresponding seven critical Trustworthy AI requirements for high-risk AI systems that apply to all industries:

1. Transparency: Include traceability, explainability and communication.
2. Diversity, non-discrimination and fairness: Include the avoidance of unfair bias, accessibility and universal design, and stakeholder participation.
3. Technical robustness and safety: Include resilience to attack and security, fall back plan and general safety, accuracy, reliability and reproducibility.
4. Privacy and data governance: Include respect for privacy, quality and integrity of data, and access to data.
5. Accountability: Include auditability, minimization and reporting of negative impact, trade-offs and redress.
6. Human agency and oversight: Include fundamental rights, human agency and human oversight.
7. Societal and environmental wellbeing: Include sustainability and environmental friendliness, social impact, society and democracy.

Additionally, International Organization for Standardization (ISO)/International Electrotechnical Commission (IEC) has also published a technical report on 'Overview of trustworthiness in artificial intelligence'. Early efforts in the open-source community are also visible towards developing TAI frameworks/tools/libraries such as IBM AI360, Google Explainable AI and TensorFlow Responsible AI.

Three key TAI aspects and associated definitions/algorithms/metrics described e.g. in the AI/ML research community are introduced below:

1. Fairness: Fairness is the process of understanding bias introduced in the data, and ensuring that the model provides equitable predictions across all demographic groups. It is important to apply fairness analysis throughout the entire AI/ML pipeline, making sure to continuously reevaluate the models from the perspective of fairness and inclusion. This is especially important when AI/ML is deployed in critical business processes that affect a wide range of end users. There are three broad approaches to detect bias in the AI/ML model:
   a. Pre-processing fairness—To detect bias in the AI/ML training data using algorithms such as Reweighing and Disparate impact remover.
   b. In-processing fairness—To detect bias in the AI/ML model generation using algorithms such as Prejudice Remover and Technical debiasing.
   c. Post-processing fairness—To detect bias in the AI/ML model decisions using algorithms such as Odds-equalizing and Reject option classification.
   Quantification of Fairness—There are several metrics that measure individual and group fairness, for example, Statistical Parity Difference, Average Odds Difference, Disparate Impact and Theil Index.
2. Explainability: Explainability of an AI/ML model refers to unveiling of the black box model, which just makes the prediction or gives the recommendation, to the White box, which actually gives the details of the underlying mechanism and pattern identified by the model for a particular dataset. There are multiple reasons why it is necessary to understand the underlying mechanism of an AI/ML model such as human readability, justifiability, interpretability and bias mitigation. There are three broad approaches to design an ML model to be explainable:
   a. Pre-modelling explainability—To understand or describe data used to develop AI/ML models, for example, using algorithms such as ProtoDash and Disentangled Inferred Prior VAE.
   b. Explainable modelling/Interpretable modelling—To develop more explainable AI/ML models, e.g., ML models with joint prediction and explanation or surrogate explainable models, for example, using algorithms such as Generalized Linear Rule Models and Teaching Explainable Decisions (TED).
   c. Post-modelling explainability—To extract explanations from pre-developed AI/ML models, for example, using algorithms such as ProtoDash, Contrastive Explanations Method, Profweight, LIME and SHAP.
   Furthermore, explanations can be local (i.e., explaining a single instance/prediction) or global (i.e., explaining the global AI/ML model structure/predictions, e.g., based on combining many local explanations of each prediction).
   Quantification of Explainability—Although it is ultimately the consumer who determines the quality of an explanation, the research community has proposed quantitative metrics as proxies for explainability. There are several metrics that measure explainability such as Faithfulness and Monotonicity.
3. Robustness (technical): There are four technical threats that any AI/ML model developers/scientists need to consider for defending and evaluating their AI/ML models and applications.
   a. Evasion: Evasion attacks involve carefully perturbing the input samples at test time to have them misclassified, for example, using techniques such as Shadow attack and Threshold attack.

b. Poisoning: Poisoning is technical contamination of training data. Machine learning systems can be re-trained using data collected during operations. An attacker may poison this data by injecting malicious samples during operation that subsequently disrupt retraining, for example, using techniques such as Backdoor attack and Technical backdoor embedding.

c. Extraction: Extraction attacks aim to duplicate a machine learning model through query access to a target model, for example, using techniques such as KnockoffNets and Functionally equivalent extraction.

d. Inference: Inference attacks determine if a sample of data was used in the training dataset of an AI/ML model, for example, using techniques such as Membership inference black-box and attribute inference black-box.

There are a number of approaches to defend AI/ML models against such technical attacks at each stage of the AI/ML design:

a. Preprocessor—For example, using techniques such as InverseGAN and DefenseGAN.

b. Postprocessor—For example, using techniques such as Reverse sigmoid and Rounding.

c. Trainer—For example, using techniques such as General technical training and Madry's protocol.

d. Transformer—For example, using techniques such as Defensive distillation and Neural cleanse.

e. Detector—For example, using techniques such as Detection based on activations analysis and Detection based on spectral signatures.

Quantification of Robustness: There are several metrics that measure robustness of ML models such as Empirical Robustness and Loss Sensitivity.

However, while such knowledge in relation to control and evaluation of trustworthiness of AI/ML models exist, no approaches for implementing such control and evaluation of trustworthiness of AI/ML models in particular for interoperable and multi-vendor environments are known.

Hence, the problem arises that control and evaluation of trustworthiness of AI/ML models in particular for interoperable and multi-vendor environments is to be provided.

Hence, there is a need to provide for trust related management of artificial intelligence or machine learning pipelines.

A framework for TAI in cognitive autonomous networks (CAN) underlies one or more example embodiments.

Figure 11:
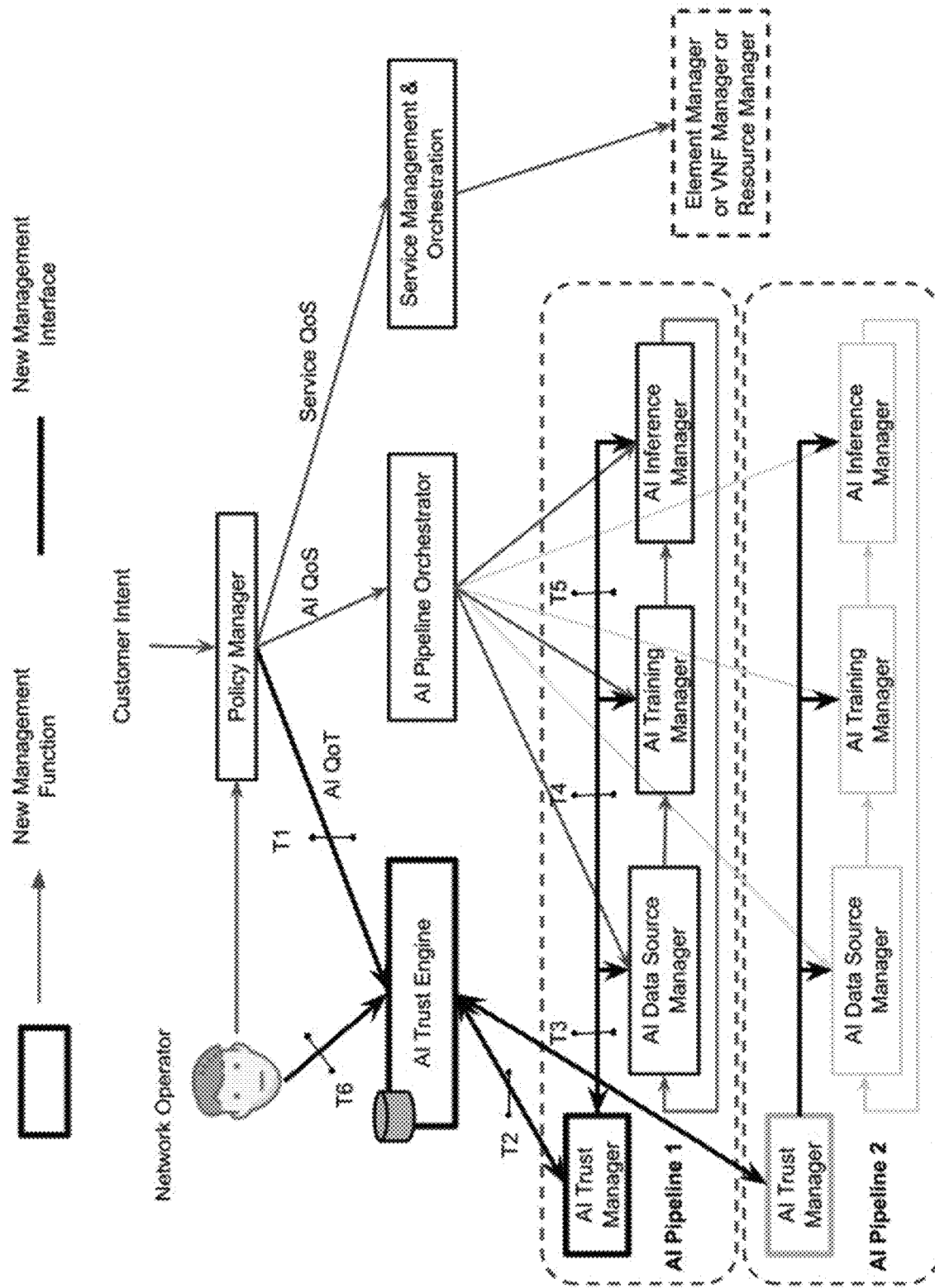
FIG. 11 shows a schematic diagram of an example of a system environment with interfaces and signaling variants according to example embodiments.

FIG. 11 shows a schematic diagram of an example of a system environment with interfaces and signaling variants according to example embodiments, and in particular illustrates example details of the trustworthy artificial intelligence framework (TAIF) in CANs underlying example embodiments.

Figure 12:
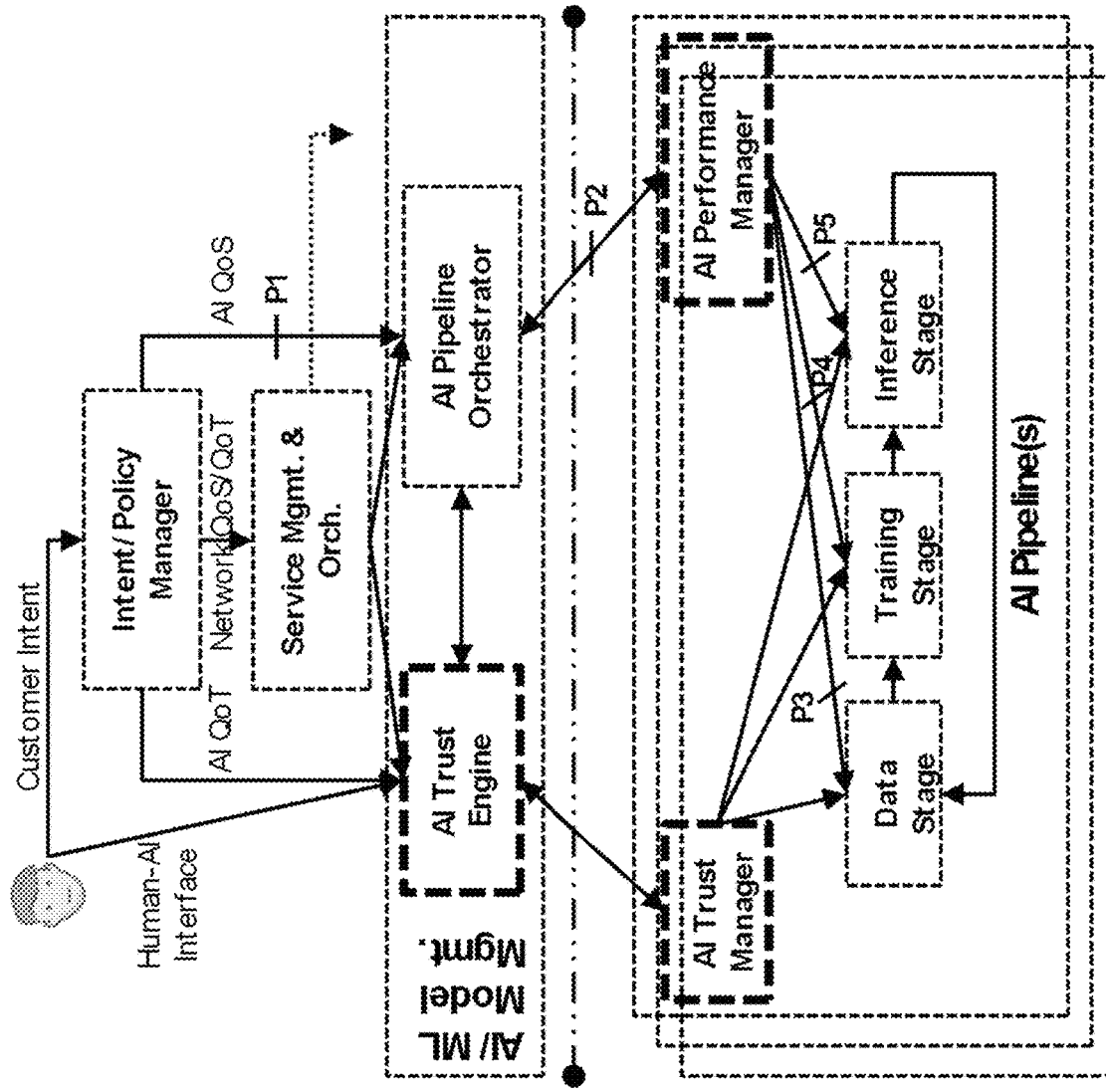
FIG. 12 shows a schematic diagram alternatively illustrating an example of a system environment with interfaces and signaling variants according to example embodiments.

FIG. 12 shows a schematic diagram alternatively illustrating an example of a system environment with interfaces and signaling variants according to example embodiments, and in particular alternatively illustrates example details of the TAIF in CANs underlying example embodiments.

Such TAIF for CANs may be provided to facilitate the definition, configuration, monitoring and measuring of AI/ML model trustworthiness (i.e., fairness, explainability and robustness) for interoperable and multi-vendor environments. A service definition or the business/customer intent may include AI/ML trustworthiness requirements in addition to quality of service (QoS) requirements, and the TAIF is used to configure the requested AI/ML trustworthiness and to monitor and assure its fulfilment. The TAIF introduces two management functions, namely, a function entity named AI Trust Engine (one per management domain) and a function entity named AI Trust Manager (one per AI/ML pipeline). The TAIF further introduces six interfaces (named T1-T6) that support interactions in the TAIF. According to the TAIF underlying example embodiments, the AI Trust Engine is center for managing all AI trustworthiness related things in the network, whereas the AI Trust Managers are use case and often vendor specific, with knowledge of the AI use case and how it is implemented.

Furthermore, the TAIF underlying example embodiments introduces a concept of AI quality of trustworthiness (AI QoT) (as seen over the T1 interface in FIG. 11) to define AI/ML model trustworthiness in a unified way covering three factors, i.e., fairness, explainability and robustness, similar to how QoS is used for network performance.

In the TAIF underlying example embodiments, a function entity named Intent/Policy Manager translates the customer intent into network QoS and network QoT (e.g., Service Level Agreement (SLA)), AI QoS (e.g., accuracy) and AI QoT (e.g., explainability, fairness, robustness) requirements and sends them to a function entity named Service Management and Orchestration (SMO), a function entity named AI Pipeline Orchestrator, the AI Trust Engine, respectively. Alternatively, the SMO may translate the network QoS and network QoT requirements into AI QoS and AI QoT requirements and send them to the AI Pipeline Orchestrator and the AI Trust Engine, respectively. The AI Pipeline Orchestrator and the AI Trust Engine may exchange information about AI QoS and AI QoT requirements with each other. Considering that the AI pipelines deployed in the network may belong to multiple vendors, API's must be exposed by the vendor-specific AI pipelines (without compromising on the vendor's intellectual property rights) towards the AI Pipeline Orchestrator and the AI Trust Engine to discover the performance and trust capabilities of the AI pipeline, to configure the AI pipeline according to the required AI QoS and AI QoT requirements, and to monitor/collect AI performance and AI trust related metrics from the AI pipeline.

Figure 13:
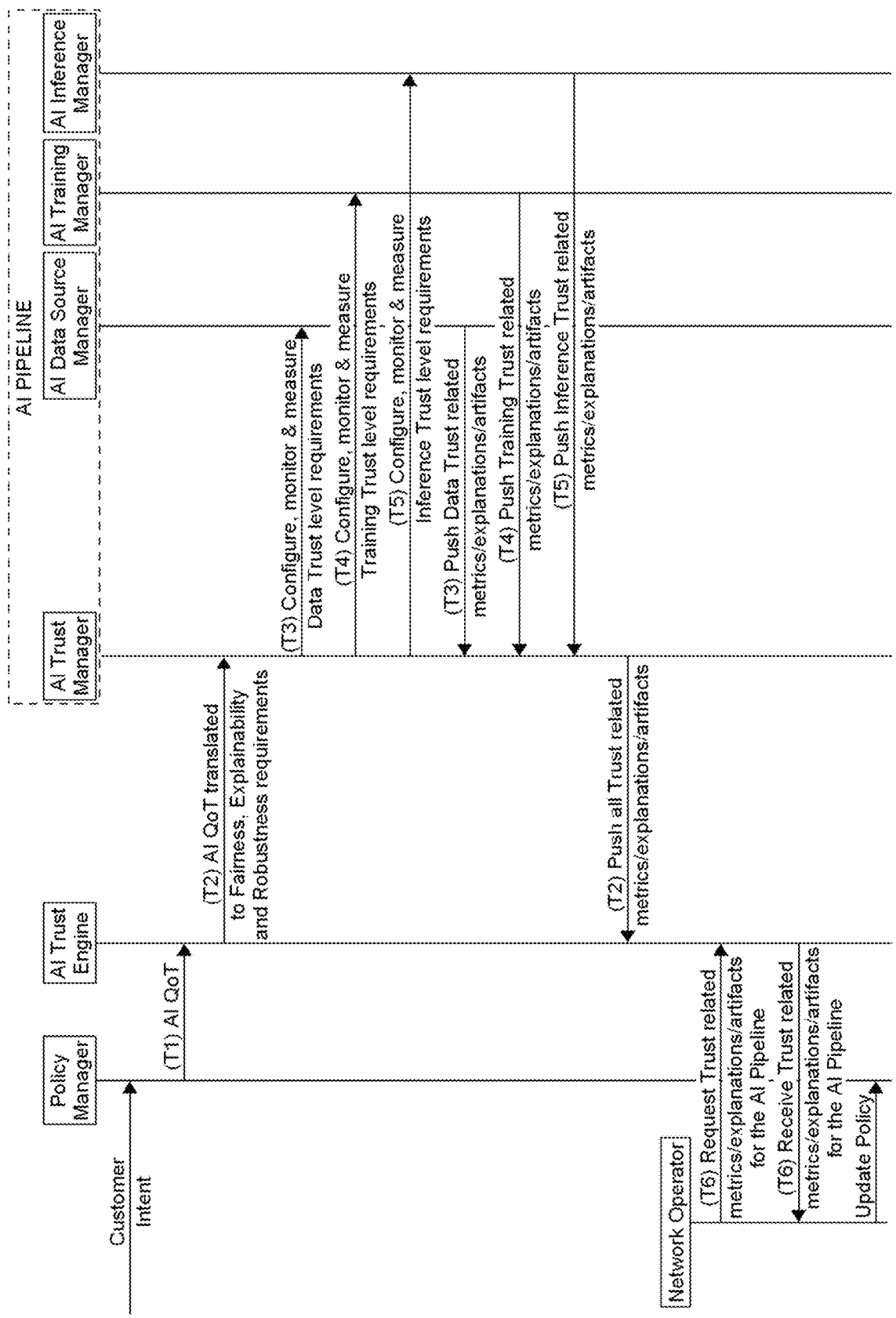
FIG. 13 shows a schematic diagram of signaling sequences according to example embodiments.

FIG. 13 shows a schematic diagram of signaling sequences according to example embodiments, and in particular illustrates an exemplary generic workflow in the TAIF underlying example embodiments.

According to the high-level generic workflow within the TAIF illustrated in FIG. 13, the network operator can specify, over the T1 interface, the required AI QoT (use case-specific) to the AI Trust Engine via e.g. a Policy Manager. The AI Trust Engine translates the AI QoT into specific AI trustworthiness (i.e., fairness, explainability and robustness) requirements and identifies the affected use-case-specific AI Trust Manager(s). Using the T2 interface, the AI Trust Engine may configure the AI Trust Managers. The use case specific and implementation-aware AI Trust Manager may configure, monitor, and measure AI trustworthiness requirements for an AI Data Source Manager, an AI Training Manager and an AI Inference Manager (of a respective AI pipeline) over T3, T4 and T5 interfaces, respectively. The measured or collected TAI metrics and/or TAI explanations from the AI Data Source Manager, AI Training Manager and AI Inference Manager regarding the AI pipeline may be pushed to the AI Trust Manager over T3, T4 and T5 interfaces, respectively. The AI Trust Manager may push the TAI metrics and/or TAI explanations to the AI Trust Engine, over the T2 interface, based on the reporting mechanisms configured by the AI Trust Engine. Finally, the network operator can request and receive the TAI metrics/explanations of an AI pipeline from the AI Trust Engine over the T6 interface. Based on the information retrieved, the Network Operator may decide to update the policy via the Policy Manager.

While the AI Trust Engine may configure the AI Trust Managers using the T2 interface, and while the AI Trust Manager may push the TAI metrics and/or TAI explanations to the AI Trust Engine over the T2 interface, potentially required operations and notifications utilizing the T2 interface to effect and/or facilitate and/or prepare such configuration and reporting need to be specified and provided.

Hence, in brief, according to example embodiments, operations and notifications of an AI Trust Manager (which may be considered as a second network entity managing AI/ML trustworthiness in an AI/ML pipeline in a network) are provided which allows an AI Trust Engine (which may be considered as a first network entity managing AI/ML trustworthiness in the network) to discover the AI trustworthiness capabilities of the AI Trust Manager, to configure the AI Trust Manager according to the required AI QoT, and/or to collect AI trustworthiness metrics or explanations over an interface which is established between the AI Trust Engine and the AI Trust Manager according to examples and which may be considered as a T2 interface (i.e., the T2 interface of the TAIF discussed above).

According to example embodiments, following the Service-Based Management Architecture (SBMA) paradigm, a strict separation of operations/notifications and management information is considered. Each of the AI trustworthiness aspects (explainability, fairness, robustness) share common operations and notifications, but have their individual network resource models (NRM).

According to example embodiments, TAI capability discovery functionalities, TAI configuration functionalities, and TAI reporting functionalities are provided by the first network entity (e.g. AI Trust Engine) and the second network entity (e.g. AI Trust Manager), respectively. These functionalities are shared by the foreseen AI trustworthiness aspects (explainability, fairness, robustness).

It is noted that example embodiments are not limited to these AI trustworthiness aspects (explainability, fairness, robustness), but the disclosed principle is applicable to other (AI) trustworthiness aspects as well.

To facilitate these functionalities, according to example embodiments, the following AI Trust Manager application programming interfaces (API) that are shared by the AI trustworthiness aspects (explainability, fairness, robustness) are provided:

1. TAI Capability Discovery API (Request/Response)—It allows the AI Trust Engine (i.e., in general, the first network entity), via (e.g.) the T2 interface, to discover AI trustworthiness methods and/or metrics and/or explanations that the AI Trust Manager (i.e., in general, the second network entity) is supporting.

2. TAI Configuration API (Request/Response)—It allows the AI Trust Engine, via (e.g.) the T2 interface, to configure appropriate AI trustworthiness method(s), AI trustworthiness metric(s) to be measured and collected and AI explanation(s) to be generated.

3. TAI Reporting API (Request/Response and Subscribe/Notify)—It allows the AI Trust Engine, via (e.g.) the T2 interface, to request/subscribe AI trustworthiness report from the AI Trust Manager.

As mentioned above, each of the trustworthiness aspects (explainability, fairness, robustness) have their individual NRM, which is used in the operation requests and responses.

Technical robustness refers to how well the AI/ML can handle failures or unexpected changes in its environment without failing. This includes, for example, missing or corrupted values in the input data due to failing instrumentation or any other reason, or robustness against minor shifts in the input data or the concept, in comparison to the AI/ML model training, without requiring a re-training.

If the AI/ML model fails, it should not fail catastrophically, i.e., should not output values that are impossible or destructive.

Measuring metrics to evaluate the model robustness may require stress testing, where the model is, for example, intentionally fed with corrupted or missing input values. Technical robustness includes also detection of possible events that may endanger the AI/ML performance and being able to notify the consumers of such events.

FIG. 14 shows a and schematic diagram of different missing data patterns.

Data can be missing in different ways. It may be missing from only one input feature (univariate), from related features (monotone), or completely randomly from different features (non-monotone), as shown in FIG. 14.

In addition, within a feature, data can be missing completely at random, partly random (e.g. sequences of consecutive missing values at random places), or not at random.

Missing data can be handled in different ways, e.g. by:
Deletion: Rows with missing data elements are removed
Imputation: Missing data is artificially filled in
    Simple imputation: such as using mean or median of the available values
    Regression imputation: missing values are replaced by values predicted for them by a regression model
    Other imputation methods: e.g., hot-deck imputation, expectation-maximization, support vector machines, etc.

Figure 15:
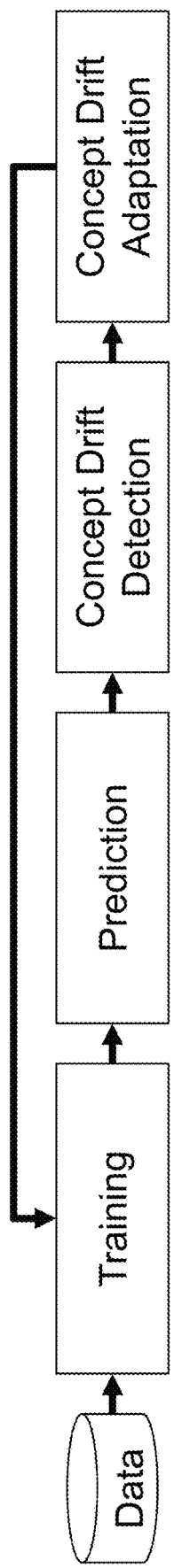
FIG. 15 shows a schematic diagram illustrating concept drift and handling thereof in machine learning.

Metrics for missing data include, for example:
Mean Absolute Error
Mean Squared Error
Root Mean Square Error
Area Under the Curve FIG. 15 shows a schematic diagram illustrating concept drift and handling thereof in machine learning.

Concept drift means that the statistical properties of the target variable, which the model is trying to predict, change over time in unforeseen ways. Conventional machine learning has two main components: training/learning and prediction. Research on learning under concept drift presents three new components: drift detection (whether or not drift occurs), drift understanding (when, how, where it occurs) and drift adaptation (reaction to the existence of drift), as shown in FIG. 15.

Concept drift detection can be error-rate based, data distribution based or multiple hypothesis test drift detection. In relation to understanding, for measuring the amount of drift, for example Kullback-Leibler divergence may be used. Adaptation may include re-training, ensembles for tackling recurrent drift, or adapting the existing trained model.

The TAIF underlying example embodiments allows the network operator to specify, over the T1 interface, the required AI QoT to the AI Trust Engine via the Policy Manager. The AI Trust Engine translates the AI QoT into individual AI trustworthy requirements (i.e., fairness, explainability, technical robustness and adversarial robustness) and identifies the vendor-specific and use case-specific AI Trust Manager over the T2 interface.

However, although in the TAIF underlying example embodiments the identified AI Trust Manager knows 'how' to configure, monitor and measure the AI technical robustness requirements for data stage, training stage and inference stage of the AI pipeline over T3, T4 and T5 interfaces, respectively, considering that the AI Trust Manager is vendor-specific, the AI Trust Engine should be the one to determine 'what' AI technical robustness methods are to be configured and/or what AI technical robustness metrics are to be measured and when and where. Additionally, the AI Trust Engine needs to be able to understand the collected AI technical robustness metrics and how they can be correlated against each other. The AI Trust Engine also needs to be aware, if an AI pipeline is operating normally and be notified of any degradation events.

Therefore, considering that the AI Trust Manager is vendor-specific, APIs need to be specified and provided to support AI technical robustness capability discovery, AI technical robustness configuration and AI technical robustness reporting between the AI Trust Engine and the AI Trust Manager for the T2 interface.

Hence, in brief, according to example embodiments, to facilitate these functionalities, according to example embodiments, the following AI Trust Manager application programming interfaces (API) for AI/ML technical robustness are provided:

1. TAI Technical Robustness Capability Discovery API (Request/Response)—It allows the AI Trust Engine, via T2 interface, to discover the use case-specific AI pipeline capabilities for monitoring and measuring AI/ML technical robustness and reliability, reporting events related to AI/ML reliability, and configuring methods to affect AI technical robustness and reliability, such as missing data imputation and concept drift detection, understanding and adaptation methods.

2. TAI Technical Robustness Configuration API (Request/Response)—It allows the AI Trust Engine, via T2 interface, to configure AI technical robustness monitoring, measuring, event conditions and methods for optimizing robustness and reliability, such as missing data imputation and concept drift detection, understanding and adaptation methods. It may be used to configure which AI/ML technical robustness and reliability measurements are to be taken and reported, when and where. It may be also used to configure technical robustness-related information, for example, in case of an external data source, the expected missing data patterns, if known in advance. This information may be used to improve the AI/ML reliability.

3. TAI Technical Robustness Reporting API (Request/Response and Subscribe/Notify)—It allows the AI Trust Engine, via T2 interface, to request/subscribe for AI/ML technical robustness and reliability measurements and/or notifications for events, where configured conditions are triggered. The measurements may be use case and vendor specific, or standardized. In the latter case, the KPIs may be interpreted in a multi-vendor scenario and may be correlated with KPIs for other AI/ML pipelines.

Example embodiments are specified below in more detail.

Figure 1:
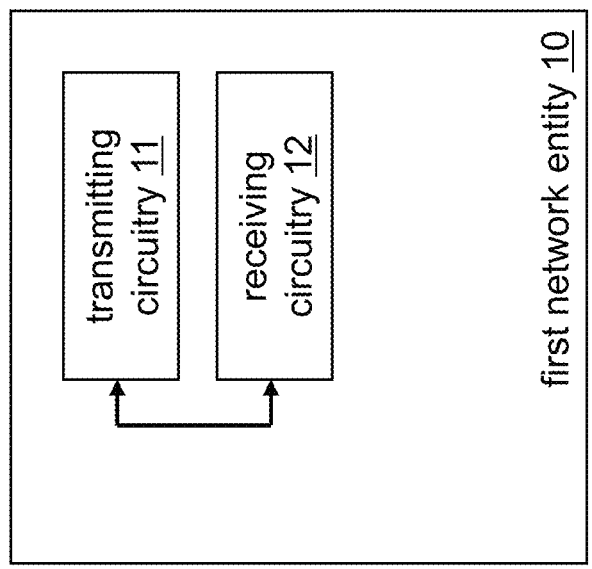
FIG. 1 is a block diagram illustrating an apparatus according to example embodiments.

FIG. 1 is a block diagram illustrating an apparatus according to example embodiments. The apparatus may be a first network entity 10 such as an AI Trust Engine (e.g. managing artificial intelligence or machine learning trustworthiness in a network) comprising a transmitting circuitry 11 and a receiving circuitry 12. The transmitting circuitry 11 transmits a first artificial intelligence or machine learning trustworthiness related message towards a second network entity managing artificial intelligence or machine learning trustworthiness in an artificial intelligence or machine learning pipeline in said network. The receiving circuitry 12 receives a second artificial intelligence or machine learning trustworthiness related message from said second network entity.

Figure 5:
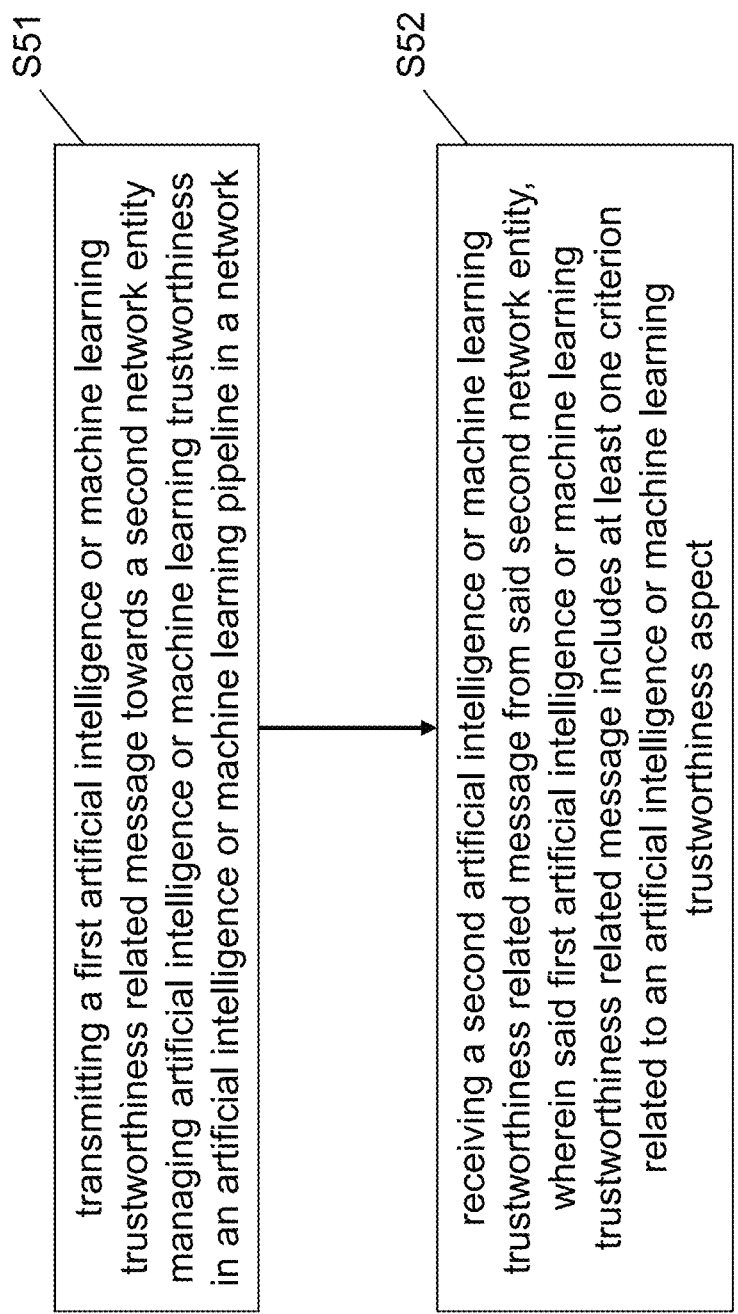
FIG. 5 is a schematic diagram of a procedure according to example embodiments.

Here, the first artificial intelligence or machine learning trustworthiness related message includes at least one criterion related to an artificial intelligence or machine learning trustworthiness aspect. FIG. 5 is a schematic diagram of a procedure according to example embodiments. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to example embodiments comprises an operation of transmitting (S51) a first artificial intelligence or machine learning trustworthiness related message towards a second network entity managing artificial intelligence or machine learning trustworthiness in an artificial intelligence or machine learning pipeline in said network, and an operation of receiving (S52) a second artificial intelligence or machine learning trustworthiness related message from said second network entity. Here, the first artificial intelligence or machine learning trustworthiness related message includes at least one criterion related to an artificial intelligence or machine learning trustworthiness aspect.

Figure 2:
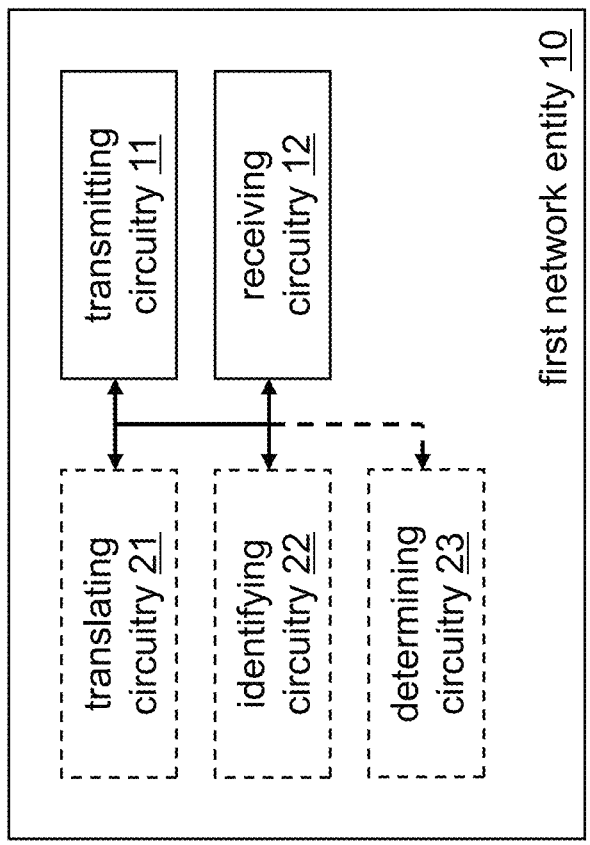
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a translating circuitry 21, an identifying circuitry 22, and a determining circuitry 23.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, said at least one criterion is embedded in a first format specific to said artificial intelligence or machine learning trustworthiness aspect.

According to further example embodiments, said artificial intelligence or machine learning trustworthiness aspect is one trustworthiness factor of artificial intelligence or machine learning model fairness, artificial intelligence or machine learning model explainability, and artificial intelligence or machine learning model robustness.

According to a variation of the procedure shown in FIG. 5, exemplary additional operations are given, which are inherently independent from each other as such. According to such variation, an exemplary method according to example embodiments may comprise an operation of translating an acquired artificial intelligence or machine learning quality of trustworthiness into requirements related to said artificial intelligence or machine learning trustworthiness aspect, and an operation of identifying said second network entity based on said acquired artificial intelligence or machine learning quality of trustworthiness. According to such variation, said first artificial intelligence or machine learning trustworthiness related message is a trustworthiness capability information request, and said second artificial intelligence or machine learning trustworthiness related message is a trustworthiness capability information response.

According to further example embodiments, said first artificial intelligence or machine learning trustworthiness related message includes scope information, said second artificial intelligence or machine learning trustworthiness related message includes capability information with respect to said artificial intelligence or machine learning trustworthiness aspect indicative of said artificial intelligence or machine learning pipeline, and said capability information with respect to said artificial intelligence or machine learning trustworthiness aspect is embedded in a second format specific to said artificial intelligence or machine learning trustworthiness aspect.

According to further example embodiments, said first format specific to said artificial intelligence or machine learning trustworthiness aspect is a manager object instance specific to said artificial intelligence or machine learning trustworthiness aspect.

Alternatively, or in addition, according to further example embodiments, said second format specific to said artificial intelligence or machine learning trustworthiness aspect is a capability information object class specific to said artificial intelligence or machine learning trustworthiness aspect.

According to a variation of the procedure shown in FIG. 5, exemplary additional operations are given, which are inherently independent from each other as such. According to such variation, an exemplary method according to example embodiments may comprise an operation of determining, based on acquired capability information with respect to said artificial intelligence or machine learning trustworthiness aspect, whether requirements related to said artificial intelligence or machine learning trustworthiness aspect can be satisfied. According to such variation, said first artificial intelligence or machine learning trustworthiness related message is a trustworthiness configuration request, and said second artificial intelligence or machine learning trustworthiness related message is a trustworthiness configuration response.

According to further example embodiments, said first artificial intelligence or machine learning trustworthiness related message includes scope information, and said second artificial intelligence or machine learning trustworthiness related message includes success information indicative of success or non-success of a configuration based on said trustworthiness configuration request.

According to further example embodiments, said first format specific to said artificial intelligence or machine learning trustworthiness aspect is a manager object instance specific to said artificial intelligence or machine learning trustworthiness aspect.

According to a variation of the procedure shown in FIG. 5, exemplary additional operations are given, which are inherently independent from each other as such. According to such variation, an exemplary method according to example embodiments may comprise an operation of determining said second network entity based on an acquired trustworthiness information demand. According to such variation, said first artificial intelligence or machine learning trustworthiness related message is a trustworthiness report request, and said second artificial intelligence or machine learning trustworthiness related message is a trustworthiness report response.

According to an alternative variation of the procedure shown in FIG. 5, exemplary additional operations are given, which are inherently independent from each other as such. According to such variation, an exemplary method according to example embodiments may comprise an operation of determining said second network entity based on an acquired trustworthiness information demand. According to such variation, said first artificial intelligence or machine learning trustworthiness related message is a trustworthiness report subscription, and said second artificial intelligence or machine learning trustworthiness related message is a trustworthiness report notification.

According to further example embodiments, said second artificial intelligence or machine learning trustworthiness related message includes an aggregation of data related to said artificial intelligence or machine learning trustworthiness aspect indicative of said artificial intelligence or machine learning pipeline, and said aggregation is embedded in a second format specific to said artificial intelligence or machine learning trustworthiness aspect.

According to further example embodiments, said first format specific to said artificial intelligence or machine learning trustworthiness aspect is a first information object class specific to said artificial intelligence or machine learning trustworthiness aspect.

Alternatively, or in addition, according to further example embodiments, said second format specific to said artificial intelligence or machine learning trustworthiness aspect is a second information object class specific to said artificial intelligence or machine learning trustworthiness aspect.

According to further example embodiments, said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

Figure 6:
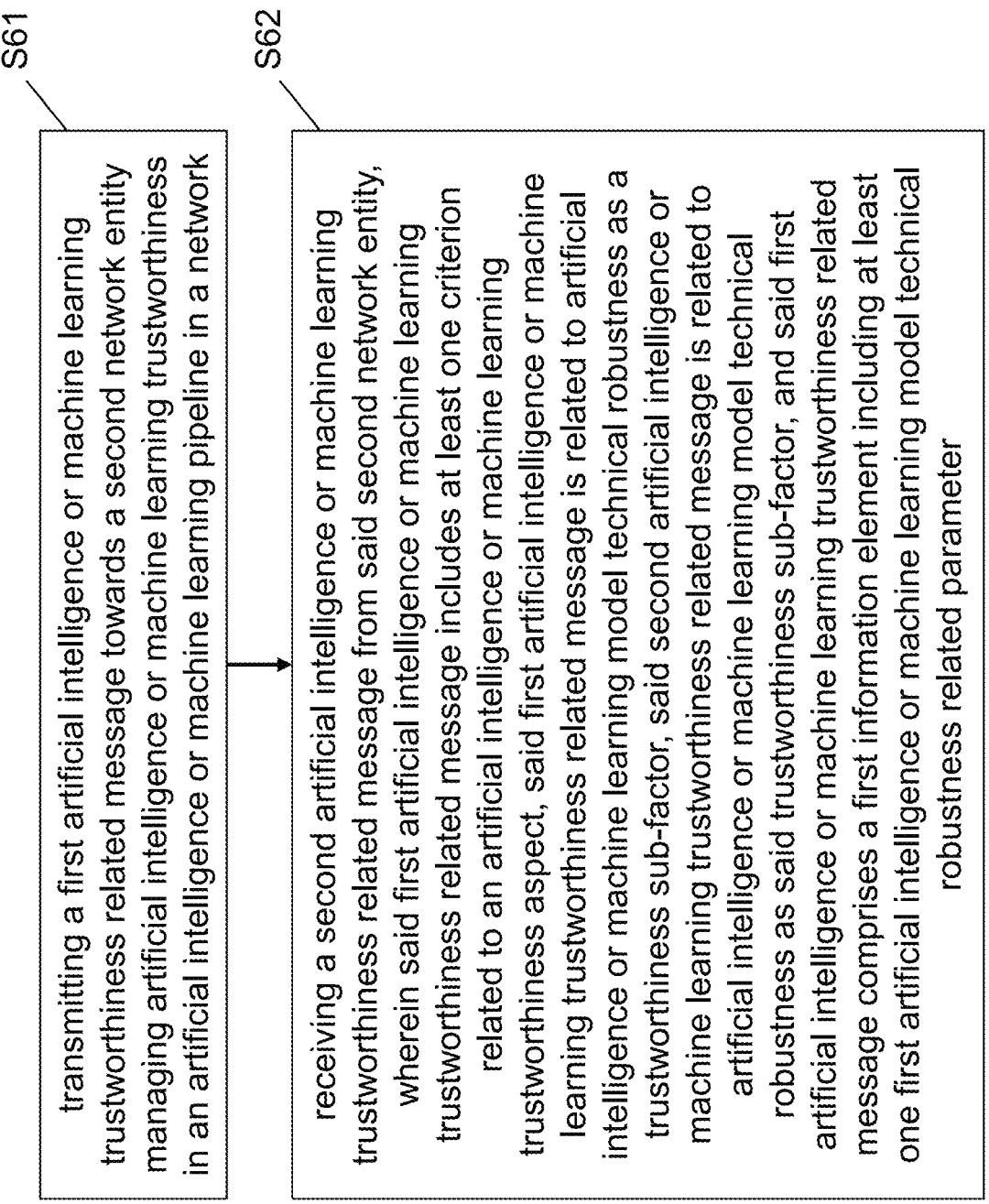
FIG. 6 is a schematic diagram of a procedure according to example embodiments.

Accordingly, in other words, as illustrated in FIG. 6 being a schematic diagram of a procedure according to example embodiments which may be performed by the apparatus of FIG. 1 but is not limited to being performed by this apparatus, a procedure according to example embodiments comprises an operation of transmitting (S61) a first artificial intelligence or machine learning trustworthiness related message towards a second network entity managing artificial intelligence or machine learning trustworthiness in an artificial intelligence or machine learning pipeline in said network, and an operation of receiving (S62) a second artificial intelligence or machine learning trustworthiness related message from said second network entity. Here, said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter (the first artificial intelligence or machine learning trustworthiness related message includes at least one criterion related to an artificial intelligence or machine learning trustworthiness aspect).

According to further example embodiments, said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes first scope information indicative of at least one artificial intelligence or machine learning pipeline to which said trustworthiness technical robustness capability information request relates, and/or first phase information indicative of at least one artificial intelligence or machine learning pipeline phase to which said trustworthiness technical robustness capability information request relates; and said at least one second artificial intelligence or machine learning model technical robustness related parameter includes at least one capability entry, wherein each respective capability entry of said at least one capability entry includes second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and/or artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

According to further example embodiments, said first artificial intelligence or machine learning trustworthiness related message is a trustworthiness technical robustness configuration request, and said second artificial intelligence or machine learning trustworthiness related message is a trustworthiness technical robustness configuration response.

According to further example embodiments, said at least one first artificial intelligence or machine learning model technical robustness related parameter includes at least one configuration entry, wherein each respective configuration entry of said at least one configuration entry includes scope information indicative of an artificial intelligence or machine learning pipeline to which said respective configuration entry relates, phase information indicative of at least one artificial intelligence or machine learning pipeline phase to which said respective configuration entry relates, missing data handling information indicative of at least one missing data handling method demanded for said at least one artificial intelligence or machine learning pipeline phase of said artificial intelligence or machine learning pipeline to which said respective configuration entry relates, concept drift detection information indicative of at least one concept drift detection method demanded for said at least one artificial intelligence or machine learning pipeline phase of said artificial intelligence or machine learning pipeline to which said respective configuration entry relates, concept drift adaptation information indicative of at least one concept drift adaptation method demanded for said at least one artificial intelligence or machine learning pipeline phase of said artificial intelligence or machine learning pipeline to which said respective configuration entry relates, artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and/or event trigger information indicative of at least one event trigger condition for triggering at least one artificial intelligence or machine learning technical robustness event.

According to further example embodiments, said trustworthiness technical robustness configuration response includes information on an operational state and/or operational status of at least one configuration target of said trustworthiness technical robustness configuration request.

According to a variation of the procedure shown in FIG. 5, exemplary additional operations are given, which are inherently independent from each other as such. According to such variation, an exemplary method according to example embodiments may comprise an operation of transmitting a third artificial intelligence or machine learning trustworthiness related message towards said second network entity, and an operation of receiving a fourth artificial intelligence or machine learning trustworthiness related message from said second network entity. Here, said third artificial intelligence or machine learning trustworthiness related message is a trustworthiness technical robustness measurement configuration request, said fourth artificial intelligence or machine learning trustworthiness related message is a trustworthiness technical robustness measurement configuration response, said third artificial intelligence or machine learning trustworthiness related message is related to artificial intelligence or machine learning model technical robustness as said trustworthiness sub-factor, said fourth artificial intelligence or machine learning trustworthiness related message is related to artificial intelligence or machine learning model technical robustness as said trustworthiness sub-factor, said third artificial intelligence or machine learning trustworthiness related message comprises a third information element including at least one third artificial intelligence or machine learning model technical robustness related parameter, and said fourth artificial intelligence or machine learning trustworthiness related message comprises a fourth information element including at least one fourth artificial intelligence or machine learning model technical robustness related parameter.

According to further example embodiments, said at least one third artificial intelligence or machine learning model technical robustness related parameter includes at least one measurement configuration entry, wherein each respective measurement configuration entry of said at least one measurement configuration entry includes scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and/or frequency information indicative of at least one measurement frequency for said at least one artificial intelligence or machine learning pipeline phase of said artificial intelligence or machine learning pipeline to which said respective capability entry relates.

According to further example embodiments, said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes scope information indicative of an artificial intelligence or machine learning pipeline to which said trustworthiness technical robustness report request relates, phase information indicative of at least one artificial intelligence or machine learning pipeline phase to which said trustworthiness technical robustness report request relates, a list indicative of technical robustness metrics demanded to be reported, start time information indicative of a begin of a timeframe for which reporting is demanded with said trustworthiness technical robustness report request, and/or stop time information indicative of an end of said timeframe for which reporting is demanded with said trustworthiness technical robustness report request; and said at least one second artificial intelligence or machine learning model technical robustness related parameter includes demanded technical robustness metrics.

According to further example embodiments, said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes scope information indicative of an artificial intelligence or machine learning pipeline to which said trustworthiness technical robustness subscription relates, phase information indicative of at least one artificial intelligence or machine learning pipeline phase to which said trustworthiness technical robustness subscription relates, a list indicative of technical robustness metrics demanded to be reported, and/or technical robustness metrics filter information indicative of a filter to by applied to said technical robustness metrics demanded to be reported; and said at least one second artificial intelligence or machine learning model technical robustness related parameter includes demanded technical robustness metrics.

According to further example embodiments, said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

According to further example embodiments, said trustworthiness technical robustness event notification includes information on a triggered configured artificial intelligence or machine learning technical robustness event.

Figure 3:
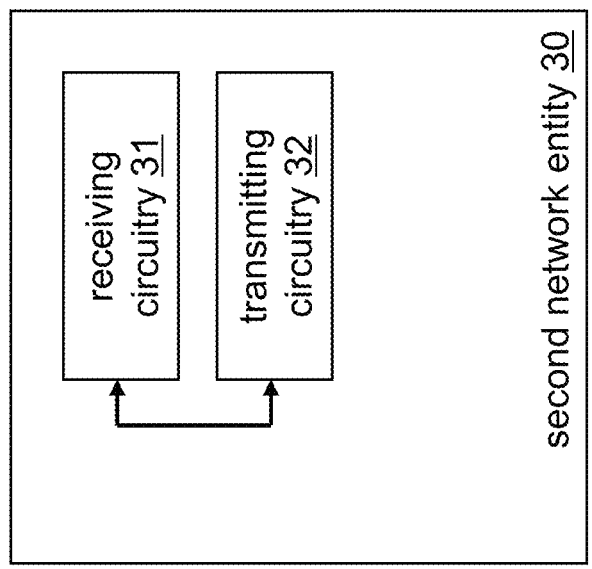
FIG. 3 is a block diagram illustrating an apparatus according to example embodiments.
Figure 7:
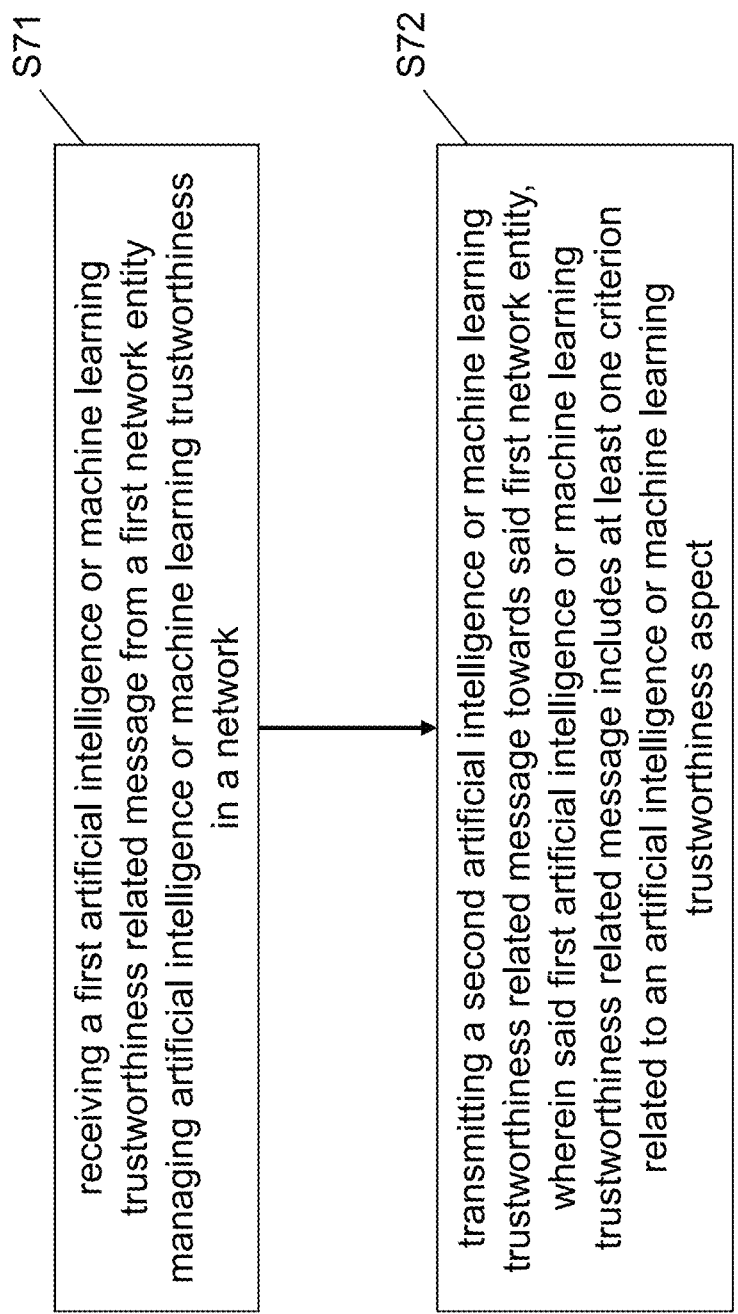
FIG. 7 is a schematic diagram of a procedure according to example embodiments.

FIG. 3 is a block diagram illustrating an apparatus according to example embodiments. The apparatus may be a second network entity 30 such as an AI Trust Manager (e.g. managing artificial intelligence or machine learning trustworthiness in an artificial intelligence or machine learning pipeline in a network) comprising a receiving circuitry 31 and a transmitting circuitry 32. The receiving circuitry 31 receives a first artificial intelligence or machine learning trustworthiness related message from a first network entity managing artificial intelligence or machine learning trustworthiness in said network. The transmitting circuitry 32 transmits a second artificial intelligence or machine learning trustworthiness related message towards said first network entity. Here, the first artificial intelligence or machine learning trustworthiness related message includes at least one criterion related to an artificial intelligence or machine learning trustworthiness aspect. FIG. 7 is a schematic diagram of a procedure according to example embodiments. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to example embodiments comprises an operation of receiving (S71) a first artificial intelligence or machine learning trustworthiness related message from a first network entity managing artificial intelligence or machine learning trustworthiness in said network, and an operation of transmitting (S72) a second artificial intelligence or machine learning trustworthiness related message towards said first network entity. Here, the first artificial intelligence or machine learning trustworthiness related message includes at least one criterion related to an artificial intelligence or machine learning trustworthiness aspect.

Figure 4:
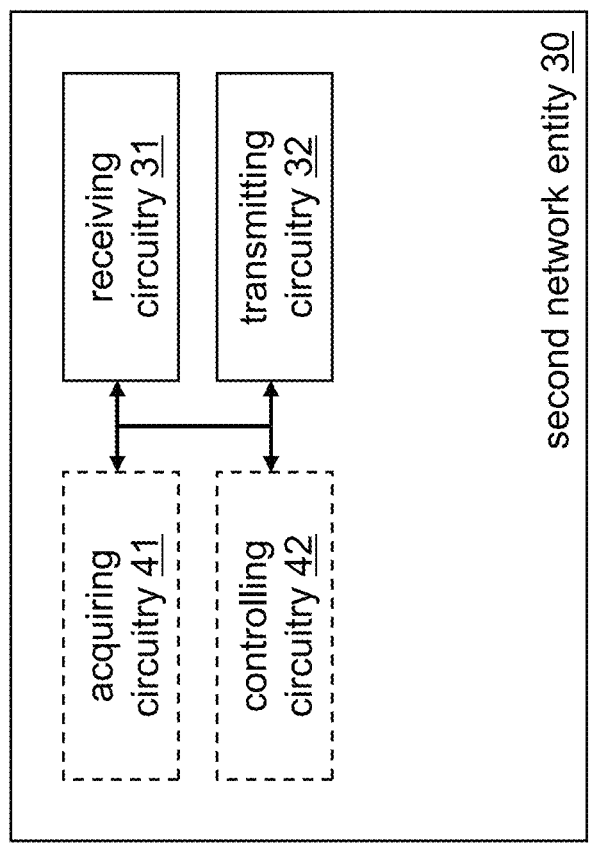
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise an acquiring circuitry 41 and a controlling circuitry 42.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to further example embodiments, said at least one criterion is embedded in a first format specific to said artificial intelligence or machine learning trustworthiness aspect.

According to further example embodiments, said artificial intelligence or machine learning trustworthiness aspect is one trustworthiness factor of artificial intelligence or machine learning model fairness, artificial intelligence or machine learning model explainability, and artificial intelligence or machine learning model robustness.

According to further example embodiments, said first artificial intelligence or machine learning trustworthiness related message is a trustworthiness capability information request, and said second artificial intelligence or machine learning trustworthiness related message is a trustworthiness capability information response.

According to a variation of the procedure shown in FIG. 7, exemplary additional operations are given, which are inherently independent from each other as such. According to such variation, an exemplary method according to example embodiments may comprise an operation of acquiring capability information with respect to said artificial intelligence or machine learning trustworthiness aspect within said artificial intelligence or machine learning pipeline. According to such variation, said first artificial intelligence or machine learning trustworthiness related message includes scope information, said second artificial intelligence or machine learning trustworthiness related message includes said capability information with respect to said artificial intelligence or machine learning trustworthiness aspect indicative of said artificial intelligence or machine learning pipeline, and said capability information with respect to said artificial intelligence or machine learning trustworthiness aspect is embedded in a second format specific to said artificial intelligence or machine learning trustworthiness aspect.

According to further example embodiments, said first format specific to said artificial intelligence or machine learning trustworthiness aspect is a manager object instance specific to said artificial intelligence or machine learning trustworthiness aspect.

Alternatively, or in addition, according to further example embodiments, said second format specific to said artificial intelligence or machine learning trustworthiness aspect is a capability information object class specific to said artificial intelligence or machine learning trustworthiness aspect.

According to further example embodiments, said first artificial intelligence or machine learning trustworthiness related message is a trustworthiness configuration request, and said second artificial intelligence or machine learning trustworthiness related message is a trustworthiness configuration response.

According to a variation of the procedure shown in FIG. 7, exemplary additional operations are given, which are inherently independent from each other as such. According to such variation, an exemplary method according to example embodiments may comprise an operation of controlling a configuration within said artificial intelligence or machine learning pipeline based on said trustworthiness configuration request. According to such variation, said first artificial intelligence or machine learning trustworthiness related message includes scope information, and said second artificial intelligence or machine learning trustworthiness related message includes success information indicative of success or non-success of said configuration based on said trustworthiness configuration request.

According to further example embodiments, said first format specific to said artificial intelligence or machine learning trustworthiness aspect is a manager object instance specific to said artificial intelligence or machine learning trustworthiness aspect.

According to further example embodiments, said first artificial intelligence or machine learning trustworthiness related message is a trustworthiness report request, and said second artificial intelligence or machine learning trustworthiness related message is a trustworthiness report response.

Alternatively, according to further example embodiments, said first artificial intelligence or machine learning trustworthiness related message is a trustworthiness report subscription, and said second artificial intelligence or machine learning trustworthiness related message is a trustworthiness report notification.

According to a variation of the procedure shown in FIG. 7, exemplary additional operations are given, which are inherently independent from each other as such. According to such variation, an exemplary method according to example embodiments may comprise an operation of acquiring collected and aggregated data within said artificial intelligence or machine learning pipeline as an aggregation of data related to said artificial intelligence or machine learning trustworthiness aspect. According to such variation, said second artificial intelligence or machine learning trustworthiness related message includes said aggregation of data related to said artificial intelligence or machine learning trustworthiness aspect indicative of said artificial intelligence or machine learning pipeline, and said aggregation is embedded in a second format specific to said artificial intelligence or machine learning trustworthiness aspect.

According to further example embodiments, said first format specific to said artificial intelligence or machine learning trustworthiness aspect is a first information object class specific to said artificial intelligence or machine learning trustworthiness aspect.

Alternatively, or in addition, according to further example embodiments, said second format specific to said artificial intelligence or machine learning trustworthiness aspect is a second information object class specific to said artificial intelligence or machine learning trustworthiness aspect.

According to further example embodiments, said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

Figure 8:
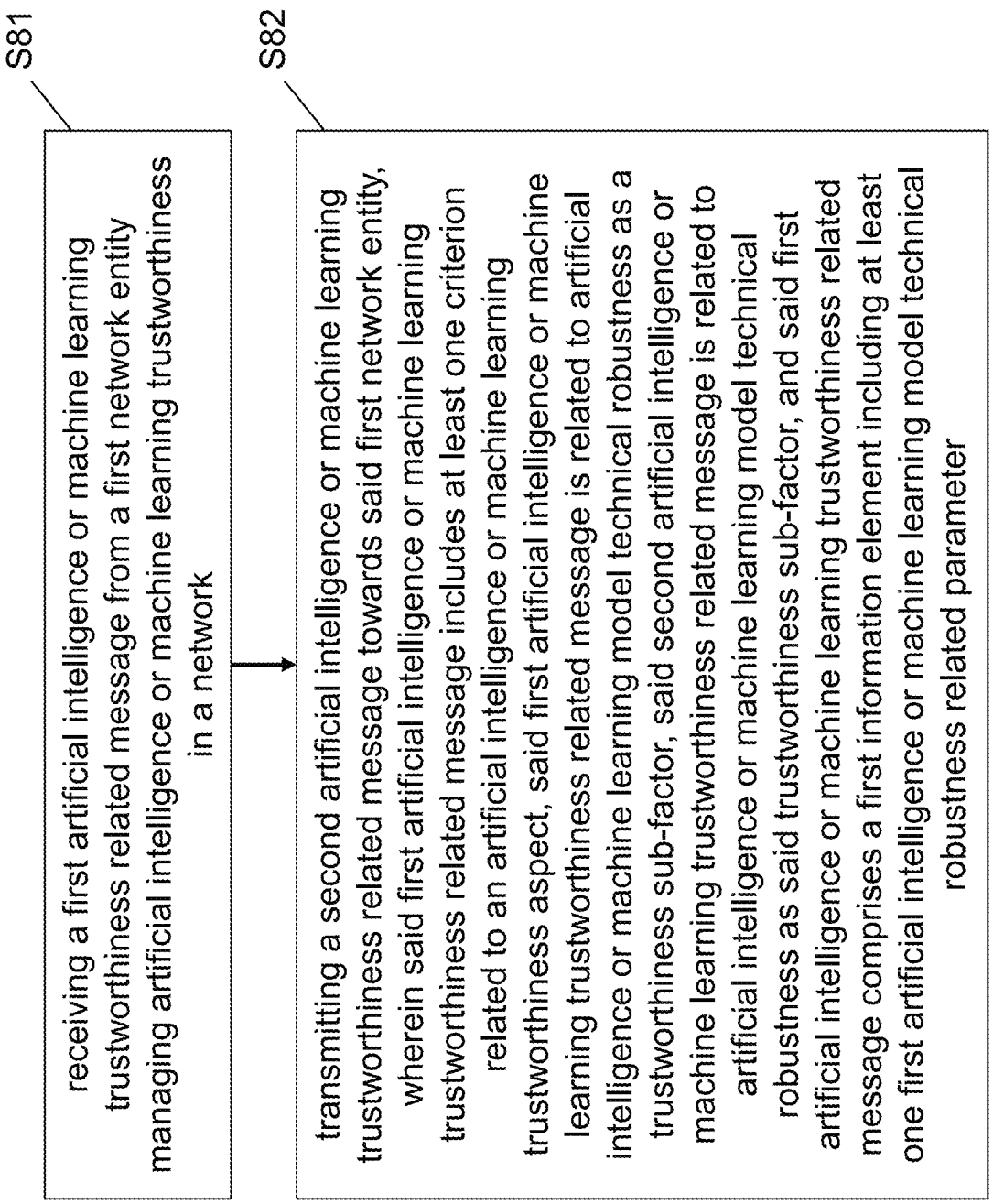
FIG. 8 is a schematic diagram of a procedure according to example embodiments.

Accordingly, in other words, as illustrated in FIG. 8 being a schematic diagram of a procedure according to example embodiments which may be performed by the apparatus of FIG. 3 but is not limited to being performed by this apparatus, a procedure according to example embodiments comprises an operation of receiving (S81) a first artificial intelligence or machine learning trustworthiness related message from a first network entity managing artificial intelligence or machine learning trustworthiness in said network, and an operation of transmitting (S82) a second artificial intelligence or machine learning trustworthiness related message towards said first network entity. Here, said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter (the first artificial intelligence or machine learning trustworthiness related message includes at least one criterion related to an artificial intelligence or machine learning trustworthiness aspect).

According to further example embodiments, said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes first scope information indicative of at least one artificial intelligence or machine learning pipeline to which said trustworthiness technical robustness capability information request relates, and/or first phase information indicative of at least one artificial intelligence or machine learning pipeline phase to which said trustworthiness technical robustness capability information request relates; and said at least one second artificial intelligence or machine learning model technical robustness related parameter includes at least one capability entry, wherein each respective capability entry of said at least one capability entry includes at least one of second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and/or artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

According to further example embodiments, said first artificial intelligence or machine learning trustworthiness related message is a trustworthiness technical robustness configuration request, and said second artificial intelligence or machine learning trustworthiness related message is a trustworthiness technical robustness configuration response.

According to further example embodiments, said at least one first artificial intelligence or machine learning model technical robustness related parameter includes at least one configuration entry, wherein each respective configuration entry of said at least one configuration entry includes scope information indicative of an artificial intelligence or machine learning pipeline to which said respective configuration entry relates, phase information indicative of at least one artificial intelligence or machine learning pipeline phase to which said respective configuration entry relates, missing data handling information indicative of at least one missing data handling method demanded for said at least one artificial intelligence or machine learning pipeline phase of said artificial intelligence or machine learning pipeline to which said respective configuration entry relates, concept drift detection information indicative of at least one concept drift detection method demanded for said at least one artificial intelligence or machine learning pipeline phase of said artificial intelligence or machine learning pipeline to which said respective configuration entry relates, concept drift adaptation information indicative of at least one concept drift adaptation method demanded for said at least one artificial intelligence or machine learning pipeline phase of said artificial intelligence or machine learning pipeline to which said respective configuration entry relates, artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and/or event trigger information indicative of at least one event trigger condition for triggering at least one artificial intelligence or machine learning technical robustness event.

According to further example embodiments, said trustworthiness technical robustness configuration response includes information on an operational state and/or operational status of at least one configuration target of said trustworthiness technical robustness configuration request.

According to a variation of the procedure shown in FIG. 7, exemplary additional operations are given, which are inherently independent from each other as such. According to such variation, an exemplary method according to example embodiments may comprise an operation of receiving a third artificial intelligence or machine learning trustworthiness related message from said first network entity, and an operation of transmitting a fourth artificial intelligence or machine learning trustworthiness related message towards said first network entity. Here, said third artificial intelligence or machine learning trustworthiness related message is a trustworthiness technical robustness measurement configuration request, said fourth artificial intelligence or machine learning trustworthiness related message is a trustworthiness technical robustness measurement configuration response, said third artificial intelligence or machine learning trustworthiness related message is related to artificial intelligence or machine learning model technical robustness as said trustworthiness sub-factor, said fourth artificial intelligence or machine learning trustworthiness related message is related to artificial intelligence or machine learning model technical robustness as said trustworthiness sub-factor, said third artificial intelligence or machine learning trustworthiness related message comprises a third information element including at least one third artificial intelligence or machine learning model technical robustness related parameter, and said fourth artificial intelligence or machine learning trustworthiness related message comprises a fourth information element including at least one fourth artificial intelligence or machine learning model technical robustness related parameter.

According to further example embodiments, said at least one third artificial intelligence or machine learning model technical robustness related parameter includes at least one measurement configuration entry, wherein each respective measurement configuration entry of said at least one measurement configuration entry includes scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and/or frequency information indicative of at least one measurement frequency for said at least one artificial intelligence or machine learning pipeline phase of said artificial intelligence or machine learning pipeline to which said respective capability entry relates.

According to further example embodiments, said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes scope information indicative of an artificial intelligence or machine learning pipeline to which said trustworthiness technical robustness report request relates, phase information indicative of at least one artificial intelligence or machine learning pipeline phase to which said trustworthiness technical robustness report request relates, a list indicative of technical robustness metrics demanded to be reported, start time information indicative of a begin of a timeframe for which reporting is demanded with said trustworthiness technical robustness report request, and/or stop time information indicative of an end of said timeframe for which reporting is demanded with said trustworthiness technical robustness report request, and said at least one second artificial intelligence or machine learning model technical robustness related parameter includes demanded technical robustness metrics.

According to further example embodiments, said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

According to further example embodiments, said at least one first artificial intelligence or machine learning model technical robustness related parameter includes scope information indicative of an artificial intelligence or machine learning pipeline to which said trustworthiness technical robustness subscription relates, phase information indicative of at least one artificial intelligence or machine learning pipeline phase to which said trustworthiness technical robustness subscription relates, a list indicative of technical robustness metrics demanded to be reported, and/or technical robustness metrics filter information indicative of a filter to by applied to said technical robustness metrics demanded to be reported; and said at least one second artificial intelligence or machine learning model technical robustness related parameter includes demanded technical robustness metrics.

According to further example embodiments, said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

According to further example embodiments, said trustworthiness technical robustness event notification includes information on a triggered configured artificial intelligence or machine learning technical robustness event.

Example embodiments outlined and specified above are explained below in more specific terms.

Figure 16:
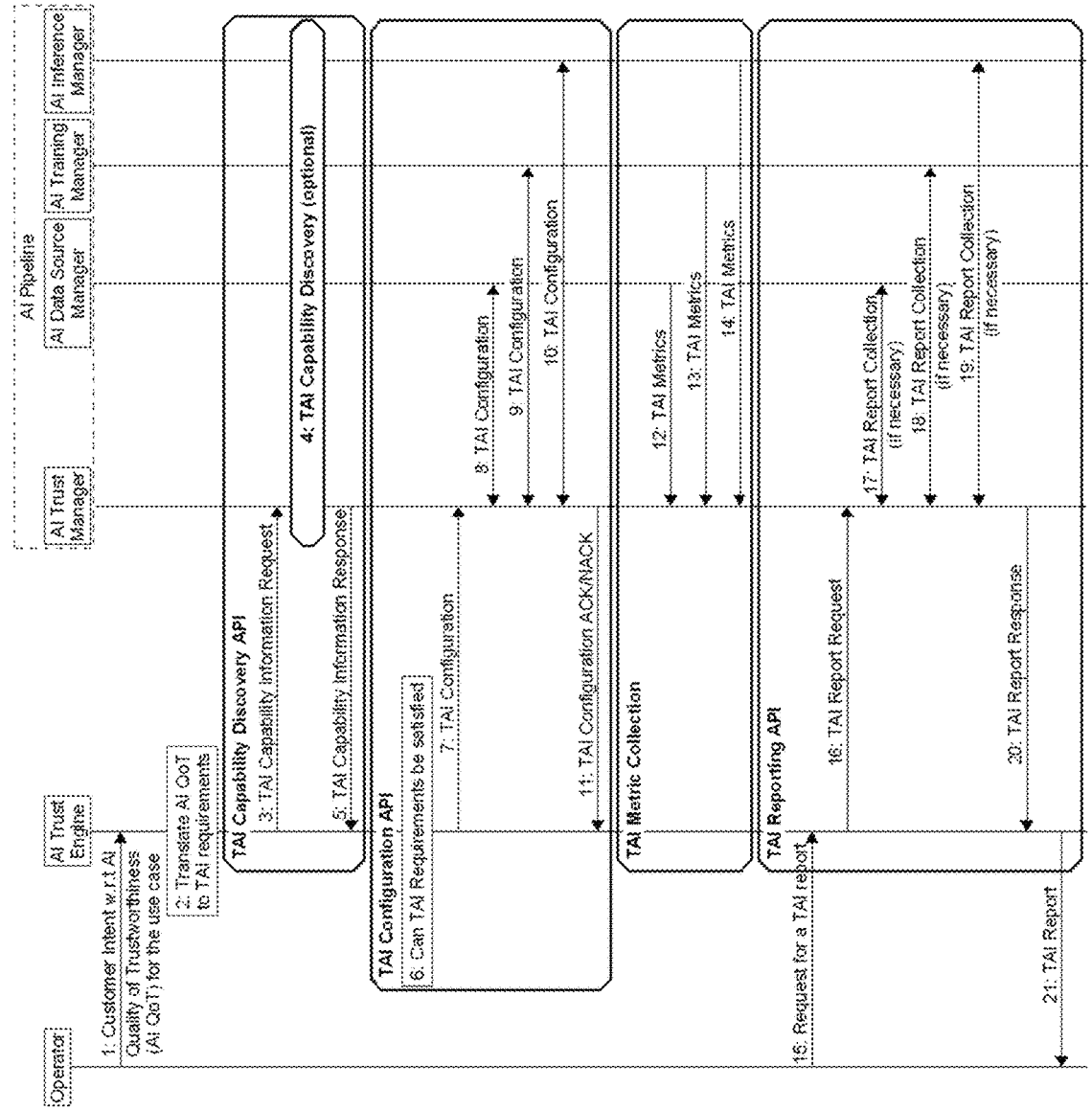
FIG. 16 shows a schematic diagram of signaling sequences according to example embodiments.

FIG. 16 shows a schematic diagram of signaling sequences according to example embodiments, and in particular illustrates details of the AI Trust APIs offered by the AI Trust Manager to the AI Trust Engine (via e.g. the T2 interface).

In FIG. 16, a sequence diagram is shown, illustrating on how the AI Trust Engine can use the APIs offered by the AI Trust Manager according to example embodiments over the T2 interface to discover, configure, measure and query/collect TAI methods and/or TAI metrics and/or TAI explanations from the use case-specific AI pipelines. The AI pipeline internal functions, including the AI Trust Manager, may be vendor and implementation specific.

In a step 1 of FIG. 16, the network operator may specify, over the T1 interface, the required AI QoT to the AI Trust Engine via the Policy Manager.

In a step 2 of FIG. 16, the AI Trust Engine may translate the AI QoT into specific AI fairness requirements and identifies the use case-specific AI Trust Manager.

In a step 3 of FIG. 16, according to example embodiments, the AI Trust Engine sends a TAI capability information request to the AI Trust Manager. The request may contain scope information and AI trustworthiness aspect (explainability, fairness, robustness) related criteria in an aspect-specific Manager Object Instance (MOI). Here, scope information may for example include the managed objects, i.e. the cognitive network functions and/or AI pipelines, for which the capabilities are requested. Further, the criteria may for example include information for which AI trustworthiness aspect (e.g. explainability, fairness or robustness) the capabilities are requested.

In a step 4 of FIG. 16, the AI Trust Manager may request the TAI capabilities of the AI Data Source Manager, Training Manager and Inference Manager, in case it is not aware of them already.

In a step 5 of FIG. 16, according to example embodiments, the AI Trust Manager provides a TAI capability information response to the AI Trust Engine. The TAI capability information response may contain an AI trustworthiness aspect (explainability, fairness, robustness) specific capability Information Object Class (IOC) for each of the requested aspects.

In a step 6 of FIG. 16, the AI Trust Engine may determine whether the TAI requirements can be satisfied.

In a step 7 of FIG. 16, according to example embodiments, the AI Trust Engine sends a TAI configuration request to the AI Trust Manager. The request may contain scope information and AI trustworthiness aspect (explainability, fairness, robustness) related criteria in an aspect-specific MOI.

In a step 8 of FIG. 16, the AI Trust Manager may configure the AI Data Source Manager accordingly, in a step 9 of FIG. 16, the AI Trust Manager may configure the AI Training Manager accordingly, and in a step 10 of FIG. 16, the AI Trust Manager may configure the AI Inference Manager accordingly.

In a step 11 of FIG. 16, according to example embodiments, the AI Trust Manager responds to the AI Trust Engine (TAI configuration response, TAI configuration ACK/NACK) and acknowledges whether the configuration was successful or not.

In a step 12 of FIG. 16, the AI Trust Manager may continuously collect TAI Metrics from the AI Data Source Manager, as configured, in a step 13 of FIG. 16, the AI Trust Manager may continuously collect TAI Metrics from the AI Training Manager, as configured, and in a step 14 of FIG. 16, the AI Trust Manager may continuously collect TAI Metrics from the AI Inference Manager, as configured.

In a step 15 of FIG. 16, the network operator may request for a TAI report.

In a step 16 of FIG. 16, according to example embodiments, the AI Trust Engine determines which AI Trust Managers are in the scope of the request and sends them a TAI report request over the T2 TAI Reporting API. The request may contain AI trustworthiness aspect (explainability, fairness, robustness) related criteria in an aspect-specific IOC. Alternatively, in step 16 of FIG. 16, e.g. after determination of the AI Trust Managers in the scope of the request, the AI Trust Engine may send them a TAI report subscription over the T2 TAI Reporting API. The subscription may as well contain AI trustworthiness aspect (explainability, fairness, robustness) related criteria in an aspect-specific IOC. Here, it is noted that the Request-Response and Subscribe-Notify alternatives are applicable independent from each other.

In a step 17 of FIG. 16, if (additional) data collection from the AI Data Source Manager is necessary/required, the AI Trust Manager may request the collection, in a step 18 of FIG. 16, if (additional) data collection from the AI Data Source Manager is necessary/required, the AI Training Manager may request the collection, and in a step 19 of FIG. 16, if (additional) data collection from the AI Data Source Manager is necessary/required, the AI Inference Manager may request the collection.

In a step 20 of FIG. 16, according to example embodiments, the AI Trust Manager collects and aggregates the required report and responds with it to the AI Trust Engine. The contents of the report may be in AI trustworthiness aspect (explainability, fairness, robustness) related criteria in an aspect-specific IOC. In case of the Subscribe-Notify alternative, in step 20 of FIG. 16, the AI Trust Manager notifies the AI Trust Engine on collected data in relation to the TAI report subscription received in step 16 of FIG. 16. The contents of the notification may as well be in AI trustworthiness aspect (explainability, fairness, robustness) related criteria in an aspect-specific IOC.

In a step 21 of FIG. 16, the AI Trust Engine may collect and aggregate the reports/notifications it receives from the AI Trust Managers and provides the report to the operator.

Figure 17:
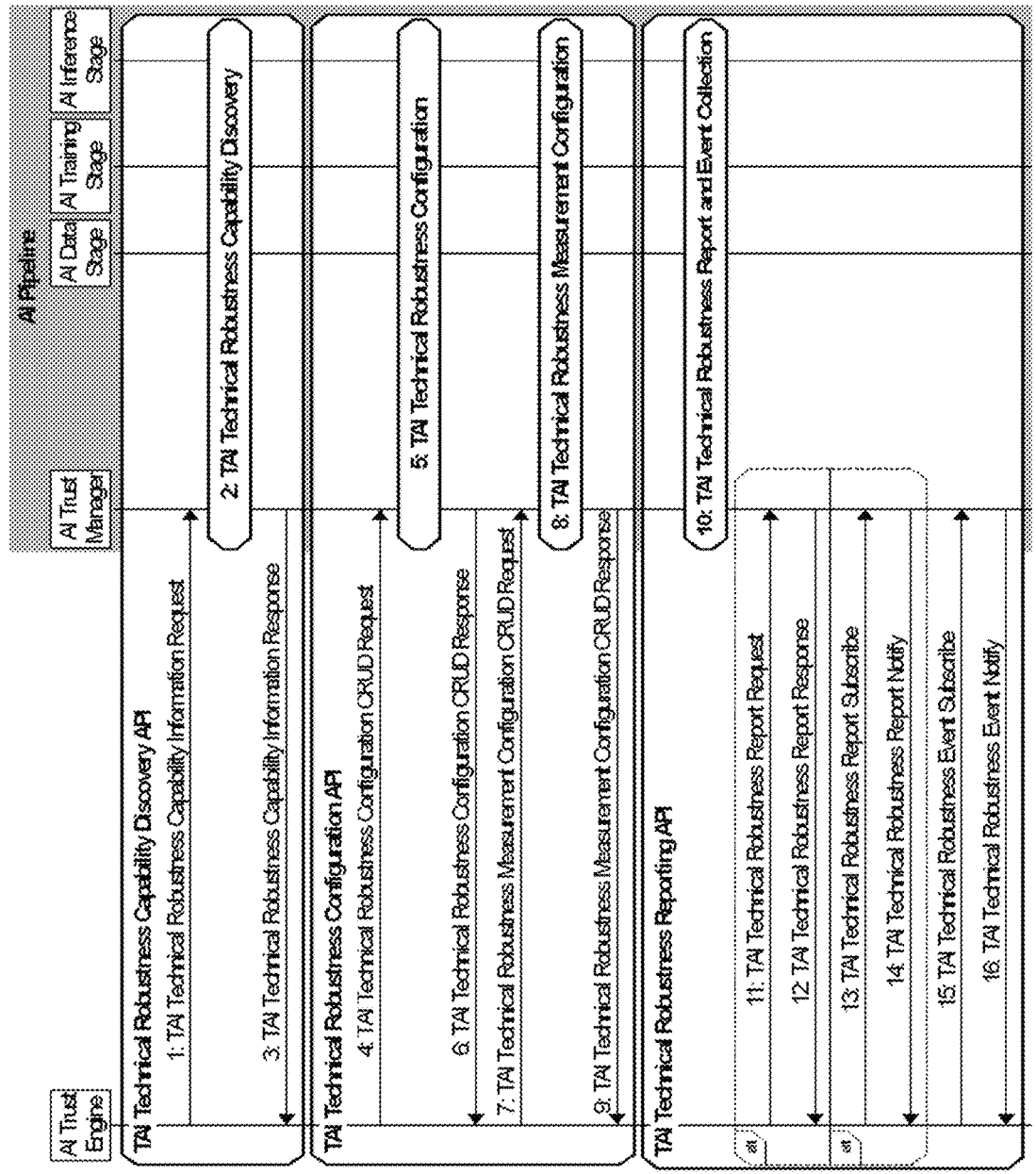
FIG. 17 shows a schematic diagram of signaling sequences according to example embodiments.

FIG. 17 shows a schematic diagram of signaling sequences according to example embodiments, and in particular illustrates details of the AI Technical Robustness APIs offered by the AI Trust Manager to the AI Trust Engine (via e.g. the T2 interface).

More specifically, FIG. 17, shows a sequence diagram illustrating on how the AI Trust Engine can use the new TAI technical robustness APIs offered by the AI Trust Manager over the T2 interface to discover and/or configure and/or report AI technical robustness methods and/or AI technical robustness. The AI pipeline internal functions, including the AI Trust Manager, may be vendor and implementation specific.

It is noted that the order of processing is not limited to that illustrated. As an example, steps of the reporting processing might be performed before steps of the configuration processing.

Steps 1 to 3 of FIG. 17 represent the TAI Technical Robustness Capability Discovery API according to example embodiments and corresponding capability processing.

In a step 1 of FIG. 17, according to example embodiments, a TAI Technical Robustness Capability Information Request (TAITRCIReq) is sent from the AI Trust Engine to the use case-specific AI Trust Manager requesting information concerning

- AI technical robustness related methods (may be based on modifying training/inference data and/or based on modifying model parameters and/or based on adding auxiliary model) that can be used to configure any compromise between the AI performance, technical robustness and adaptiveness, and/or
- AI technical robustness metrics and events that the AI Trust Manager supports.

According to example embodiments, the TAITRCIReq may comprise one or more of the parameters specified in the table below.

| Parameter | Mandatory/Optional | Description |
|---|---|---|
| CNF Scope | Mandatory | Which AI pipelines the AI technical robustness capability information is requested for. |
| >CNF Phase | Optional | Which phase (data, training, inference) of the AI pipeline the AI technical robustness capability information is requested for. The default is for all stages. |

In a step 2 of FIG. 17, the AI Trust Manager determines all the information requested in the TAITRCIReq by interacting with the AI Data stage and/or AI Training stage and/or AI Inference stage of the use case.

In a step 3 of FIG. 17, according to example embodiments, the AI Trust Manager sends a TAI Technical Robustness Capability Information Response (TAITRCIResp) consisting of all the information about the use case on the supported AI technical robustness methods and/or AI technical robustness metrics back to the AI Trust Engine. According to example embodiments, the TAITRCIResp may comprise one or more of the parameters specified in the table below.

| Parameter | Mandatory/Optional | Description |
|---|---|---|
| CNF ID | Mandatory | Which AI pipeline the AI technical robustness capability information is valid for. |
| >CNF Phase | Optional | Which phase (data, training, inference) of the AI pipeline the AI technical robustness capability information is valid for. |
| >> Supported Data Imputation Methods | Mandatory | Which data imputation methods the AI pipeline supports, such as deletion, simple imputation, regression imputation or ML-based imputation methods. |
| >> Supported Missing Data Metrics | Mandatory | For example: Mean Absolute Error (MAE) Mean Squared Error (MSE) Root Mean Square Error (RMSE) Area under the curve (AUC) |
| >> Supported Concept Drift Detection Methods | Mandatory | Which concept drift detection methods are supported, such as error based, data distribution based, or multiple hypothesis. |
| >> Supported Concept Drift Metrics | Mandatory | Which concept drift metrics can be provided, such as Kullback-Leibler divergence, Hellinger distance or total variation distance. |
| >> Supported Concept Drift Adaptation Methods | Mandatory | Which concept drift adaptation methods are supported, such as model adaptation, ensembles (for recurring drift) or model retraining. |
| >> Supported AI Technical Robustness Events | Mandatory | Which AI technical robustness events the AI pipeline supports. |
| >> Supported Additional AI Technical Robustness Methods | Optional | Any other additional AI technical robustness methods supported by the AI pipeline. |
| >> Supported Additional AI Technical Robustness Metrics | Optional | Any other additional AI technical robustness metrics supported by the AI pipeline. |

Steps 4 to 9 of FIG. 17 represent the TAI Technical Robustness Configuration API according to example embodiments and corresponding capability processing.

In a step 4 of FIG. 17, according to example embodiments, a TAI Technical Robustness Configuration CRUD Request (TAITRConReq) is sent from the AI Trust Engine to the use case-specific AI Trust Manager for configuring (creating, reading, updating and deleting) appropriate AI technical robustness methods and/or event conditions for triggering AI technical robustness events (CRUD: create, read, update, and delete). Additionally, the AI Trust Engine may provide additional AI technical robustness related information to the AI Trust Manager, such as expected rate and patterns of missing data, in case not all data sources are controlled by the AI Data stage. According to example embodiments, the TAITRConReq may comprise one or more of the parameters specified in the table below.

| Parameter | Mandatory/Optional | Description |
|---|---|---|
| CNF ID | Mandatory | Which AI pipeline the AI technical robustness configuration is requested for. |
| >CNF Phase | Optional | Which phase (data, training, inference) of the AI pipeline the AI technical robustness configuration is requested for. |
| >> Data imputation method | Optional | Which data imputation method the AI pipeline should use. |
| >> Concept drift detection method | Optional | Which concept drift method the AI pipeline should use. |
| >> Concept drift adaptation method | Optional | Which concept drift adaptation method the AI pipeline should use. |
| >> Additional AI Technical Robustness Methods | Optional | Which additional AI technical robustness methods need to be configured in a particular phase of the AI pipeline. |

| Parameter | Mandatory/Optional | Description |
| --- | --- | --- |
| >> AI Technical Robustness Event Triggers | Optional | Event trigger conditions for triggering specified AI technical robustness events. For example, a condition could be a threshold for the missing data ratio for a given input to the AI pipeline. |
| >> Additional Information | Optional | Information on missing data rates and patterns. |

In a step 5 of FIG. 17, the AI Trust Manager configures the requested technical robustness methods and/or event conditions in the AI Data Stage and/or AI Training Stage and/or AI Inference Stage of the use case.

In a step 6 of FIG. 17, according to example embodiments, depending on whether the configuration process in the previous step was successful or not, the AI Trust Manager responds to the AI Trust Engine with the TAI Technical Robustness Configuration CRUD Response (TAITRCon-Resp) containing an ACK/NACK. Additionally, the TAI configuration may contain, as a read-only parameter, operational state (enabled/disabled) and operational status attributes as in the ITU-T recommendation X.731 State Management Function. Of the operational status values, especially relevant are:

In test: The resource is undergoing a test procedure.

Failed: The resource has an internal fault that prevents it from operating. The operational state is disabled.

Degraded: The service available from the resource is degraded in some respect, such as in speed or operating capacity. Failure of a test or an unacceptable performance measurement has established that some or all services are not functional or are degraded due to the presence of a defect. However, the resource remains available for service, either because some services are satisfactory or because degraded service is preferable to no service at all. Object-specific attributes may be defined to represent further information indicating, for example, which services are not functional and the nature of the degradation. The operational state is enabled.

In a step 7 of FIG. 17, according to example embodiments, a TAI Technical Robustness Measurement Configuration CRUD Request (TAITRMConReq) is sent from the AI Trust Engine to the use case-specific AI Trust Manager for configuring (creating, reading, updating and deleting) what AI technical robustness and reliability metrics to measure, where (in which AI pipelines, Cognitive Network Functions (CNFs) or other Managed Objects). Specific technical robustness metrics, requiring stress-testing or similar approaches, may be costly to measure, so it is important for the AI Trust Engine to be able to configure the measurements as necessary. According to example embodiments, the TAITRMConReq may comprise a list of TAI Technical Robustness Measurement Job (TAITRMJ) objects including one or more of the parameters specified in the table below.

| Parameter | Mandatory/Optional | Description |
| --- | --- | --- |
| CNF IDs | Mandatory | Which AI pipelines the AI technical robustness configuration is requested for. |
| CNF Phase | Optional | Which phase (training, inference) of the AI pipeline the AI technical robustness configuration is requested for. |
| Metrics | Mandatory | A list of AI technical robustness metrics collected in this job. The metrics may be, for example, for missing data rates or data/concept drift. |
| Schedule | Mandatory | A schedule, when the measurements are collected. |
| Frequency | Optional | How frequently repetitive measurements are taken. If omitted, measurement is only taken once at the beginning of the scheduled time. |

In a step 8 of FIG. 17, the AI Trust Manager configures the requested technical robustness measurements in the AI Data Stage and/or AI Training Stage and/or AI Inference Stage of the use case.

In a step 9 of FIG. 17, according to example embodiments, depending on whether the configuration process in the previous step was successful or not, the AI Trust Manager responds to the AI Trust Engine with a TAI Technical Robustness Measurement Configuration CRUD Response (TAITRMConResp) containing an ACK/NACK.

Steps 10 to 16 of FIG. 17 represent the TAI Technical Robustness Reporting API according to example embodiments and corresponding capability processing.

As indicated by the AI pipeline capabilities by the AI Trust Manager, the TAI Technical Robustness Metrics may include, for example:

Metrics for missing data:
  Type of missing data: univariate, monotone, non-monotone
  Mean Absolute Error (MAE)
  Mean Squared Error (MSE)
  Root Mean Square Error (RMSE)
  Area under the curve (AUC)
Metrics for data and/or concept drift:
  Kullback-Leibler divergence
  Hellinger distance
  Total variation distance.

In a step 10 of FIG. 17, the AI Trust Manager collects the TAI technical robustness metrics, configured in step 8 of FIG. 17, and the TAI technical robustness events from the AI Data Stage and/or AI Training Stage and/or AI Inference Stage of the use case.

In a step 11 of FIG. 17, according to example embodiments, a TAI Technical Robustness Report Request (TAITRRReq) is sent from the AI Trust Engine to the use case-specific AI Trust Manager containing the reporting configuration. According to example embodiments, the TAITRRReq may comprise one or more of the parameters specified in the table below.

| Parameter | Mandatory/Optional | Description |
| --- | --- | --- |
| CNF ID | Mandatory | Which AI pipeline the AI technical robustness report is requested for. |
| >CNF Phase | Optional | Which phase (data, training, inference) of the AI pipeline the AI technical robustness report is requested for. |
| > >List of AI Technical Robustness metrics | Mandatory | Which AI technical robustness metrics need to be reported. |

| Parameter | Mandatory/ Optional | Description |
| --- | --- | --- |
| >>Start Time | Optional | If Report Type is periodic, what is the start time for reporting. |
| >>End Time | Optional | If Report Type is periodic, what is the end time for reporting. |

In a step 12 of FIG. 17, according to example embodiments, the AI Trust Manager sends a TAI Technical Robustness Report Response (TAITRRResp) to the AI Trust Engine as per the reporting configuration specified in the TAITRR-Req.

Alternatively to step 11 of FIG. 17 in which the AI Trust Engine requests the AI Trust Manager for single/periodic reports (i.e., Request-Response model), in a step 13 of FIG. 17, according to example embodiments, the AI Trust Engine may subscribe to notifications/reports from the AI Trust Manager (i.e., Subscribe-Notify model) via an TAI Technical Robustness Report Subscribe (TAITRRSub) message. According to example embodiments, the TAITRRSub may comprise one or more of the parameters specified in the table below.

| Parameter | Mandatory/ Optional | Description |
| --- | --- | --- |
| CNF ID | Mandatory | Which AI pipeline the AI technical robustness report is requested for. |
| >CNF Phase | Optional | Which phase (data, training, inference) of the AI pipeline the AI technical robustness report is requested for. |
| > >List of AI Technical Robustness metrics | Mandatory | Which AI technical robustness metrics need to be reported. |
| TAI Technical Robustness Report Subscription Filter | Optional | An additional filter for the subscribed AI technical robustness metrics. |

In a step 14 of FIG. 17, according to example embodiments, when there are new measurements from the configured AI Robustness Measurement Jobs that are within the scope and the subscription filter, The AI Trust Manager sends a TAI Technical Robustness Report Notify (TAITRRNot) message to the AI Trust Engine consisting of actual AI Robustness Metrics.

Alternatively to steps 11 and 13 of FIG. 17, in a step 15 of FIG. 17, according to example embodiments, the AI Trust Engine may subscribe to AI Robustness Events from the AI Trust Manager (i.e., Subscribe-Notify model) via an TAI Technical Robustness Event Subscribe.

In a step 16 of FIG. 17, according to example embodiments, whenever there are new AI Robustness Events as configured in step 4 of FIG. 17, The AI Trust Manager sends a TAI Technical Robustness Event Notify (TAITRENot) message to the AI Trust Engine to inform it of the event.

Figure 18:
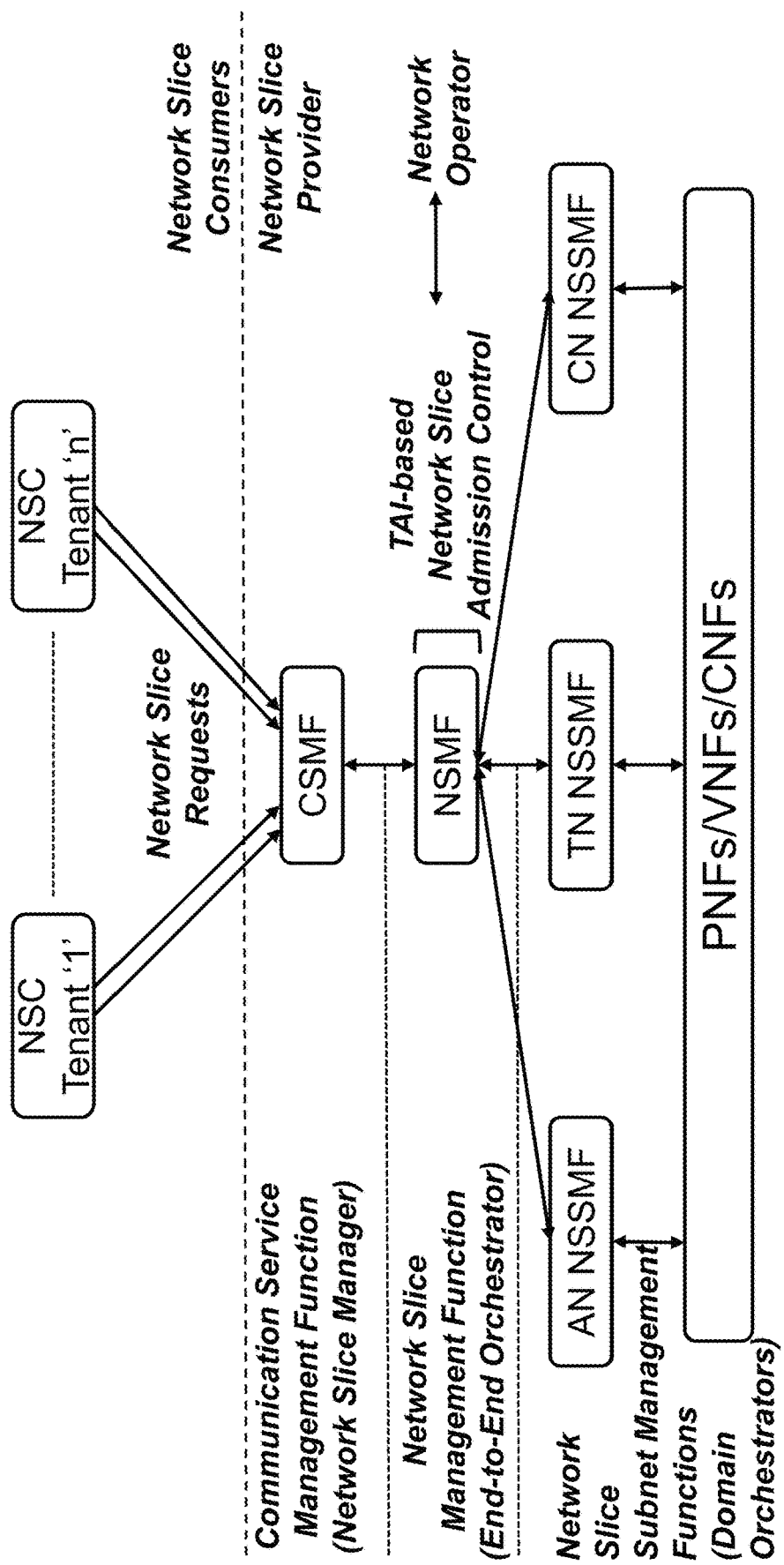
FIG. 18 shows a schematic diagram of another example of a system environment with signaling variants according to example embodiments.

FIG. 18 shows a schematic diagram of another example of a system environment with signaling variants according to example embodiments, and in particular illustrates a TAI-based proactive network slice admission control as a use case according to example embodiments.

In particular, with reference to FIG. 18, a specific use case related to fairness in ML-based network slice admission control is explained.

FIG. 18 provides a high-level view of the mentioned end-to-end network slicing use case. The network slice consumers (e.g., Tenant 1, Tenant n) can request for end-to-end (i.e., access network (AN), transport network (TN) and core network (CN)) network slices from the network slice provider (e.g., network operator).

The network operator may verify whether the requested network slices can be provisioned with the desired service level agreements (SLA) in the physical network (e.g., using a Communication Service Management Function (CSMF), a Network Slice Management Function (NSMF), Network Slice Subnet Management Functions (NSSMF)) and may respond with an ACK/NACK to the tenants.

It is now supposed that the network operator receives simultaneous network slice requests from multiple tenants. In that case, the network operator may consider the Tier (e.g., Platinum, Gold, Silver and Bronze, which is assigned by the network operator based on the contract) of the tenant before determining which network slice request to be verified and accepted first. But in addition to Tier, other features such as the waiting time (i.e., after multiple attempts) for the tenant to get a network slice approved, the priority of the network slice requests, etc., needs to be considered.

Alternatively, and having example embodiments in mind, the network operator can design and deploy an ML-based network slice admission control algorithm in the NSMF that can predict the future traffic load of current network slices from various tenants and thereby accept/reject new network slice requests to maximize the overall system utilization while limiting the risk of violating SLAs.

However, it is supposes that 'Tier' is used as one of the features while training the ML algorithm. In that case, it can play a significant role in predicting the acceptance/rejection of network slice requests because the training dataset happened to have better acceptance for one Tier group than for another.

Therefore, the network operator may want to detect, understand and mitigate any such unwanted ML-based algorithmic bias towards one or more of the network slice consumers.

This can be configured and monitored using the TAIF T2 APIs according to example embodiments as discussed below.

Namely, in a step 1 of the considered use case, the operator defines the key performance indicators (KPI) and the protected attributes, where unwanted bias should be removed in the AI Trust Engine. In this example, the protected attributes are the network slice consumers and the KPI is the network slice request acceptance ratio.

Further, in a step 2 of the considered use case, the AI Trust Engine checks with the AI Trust Manager(s) the current bias observed in the protected attributes using the TAI Reporting API and determines whether the fairness requirements are already fulfilled or not Further, in a step 3 of the considered use case, if not, i.e., if the fairness requirements are not already fulfilled, the AI Trust Engine requests the capabilities of the AI Trust Manager(s) and determines how the fairness requirements are mapped to the AI Trust Manager(s).

Further, in a step 4 of the considered use case, using the TAI Configuration API, the AI Trust Engine reconfigures the fairness requirements towards the AI Trust Manager.

Finally, in a step 5 of the considered use case, using the TAI Reporting API, the AI Trust Engine monitors that the updated configuration fulfills the fairness requirements.

A further specific example is given below for the particular use case "TAI Technical Robustness in QoS Prediction"

to illustrate the usage of TAI technical robustness APIs provided for the T2 interface according to example embodiments.

More specifically, QoS prediction for edge cloud offloading optimization of UE applications is used as an example to illustrate how the TAI Technical Robustness API is used.

Figure 19:
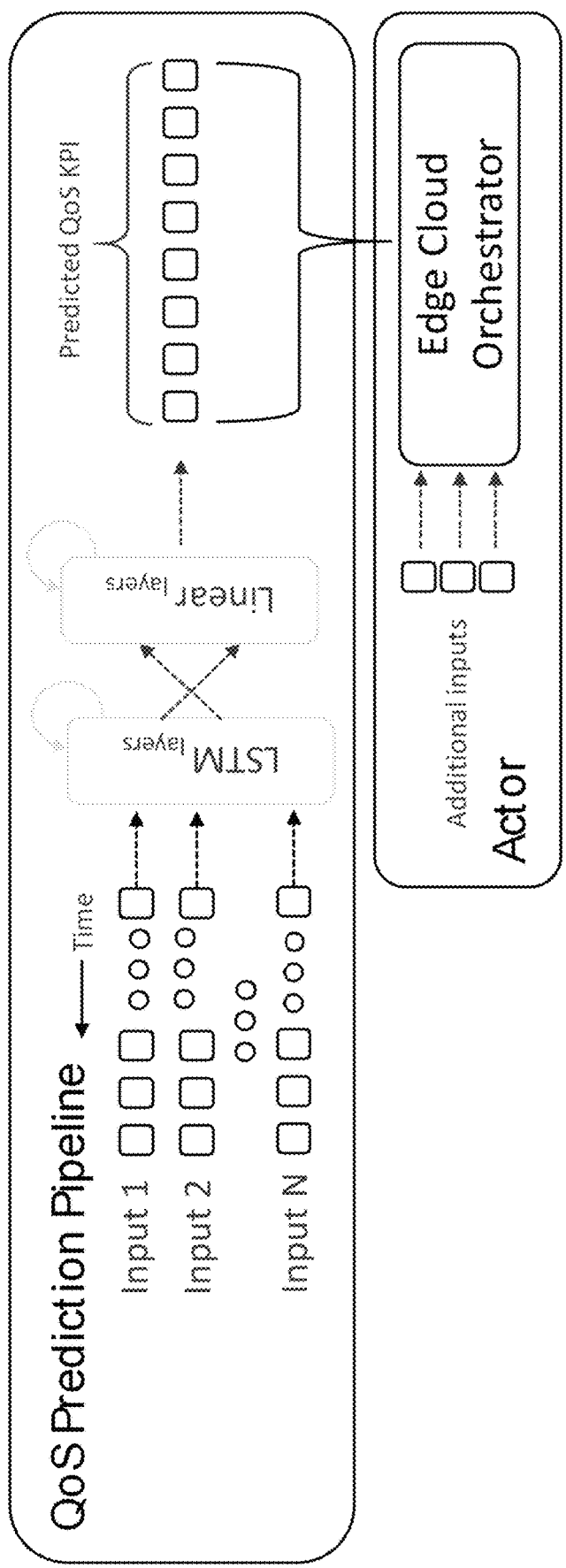
FIG. 19 shows a schematic diagram of an example application case of machine learning and a management thereof according to example embodiments.

FIG. 19 shows a schematic diagram of an example application case of machine learning and a management thereof according to example embodiments, and in particular illustrates QoS prediction for edge cloud offloading optimization.

More specifically, FIG. 19 presents the architecture of the example use case. The QoS Prediction AI Pipeline (QoS-PAIP) is predicting a selected QoS KPI, such as throughput (DL/UL) or latency, using a number of input time series of UE and network measurements. The predicted QoS KPI is consumed by the Edge Cloud Orchestrator (ECO), which uses it as an additional input to decide the optimal placement for given services, acting as an actor and consumer utilizing the AI/ML predictions. It may dynamically decide either to move an application from the UE to the edge cloud or vice versa. For example, predicted UL throughput maybe used to decide if an application can be offloaded into an edge cloud or should be executed locally on the device.

Figure 20:
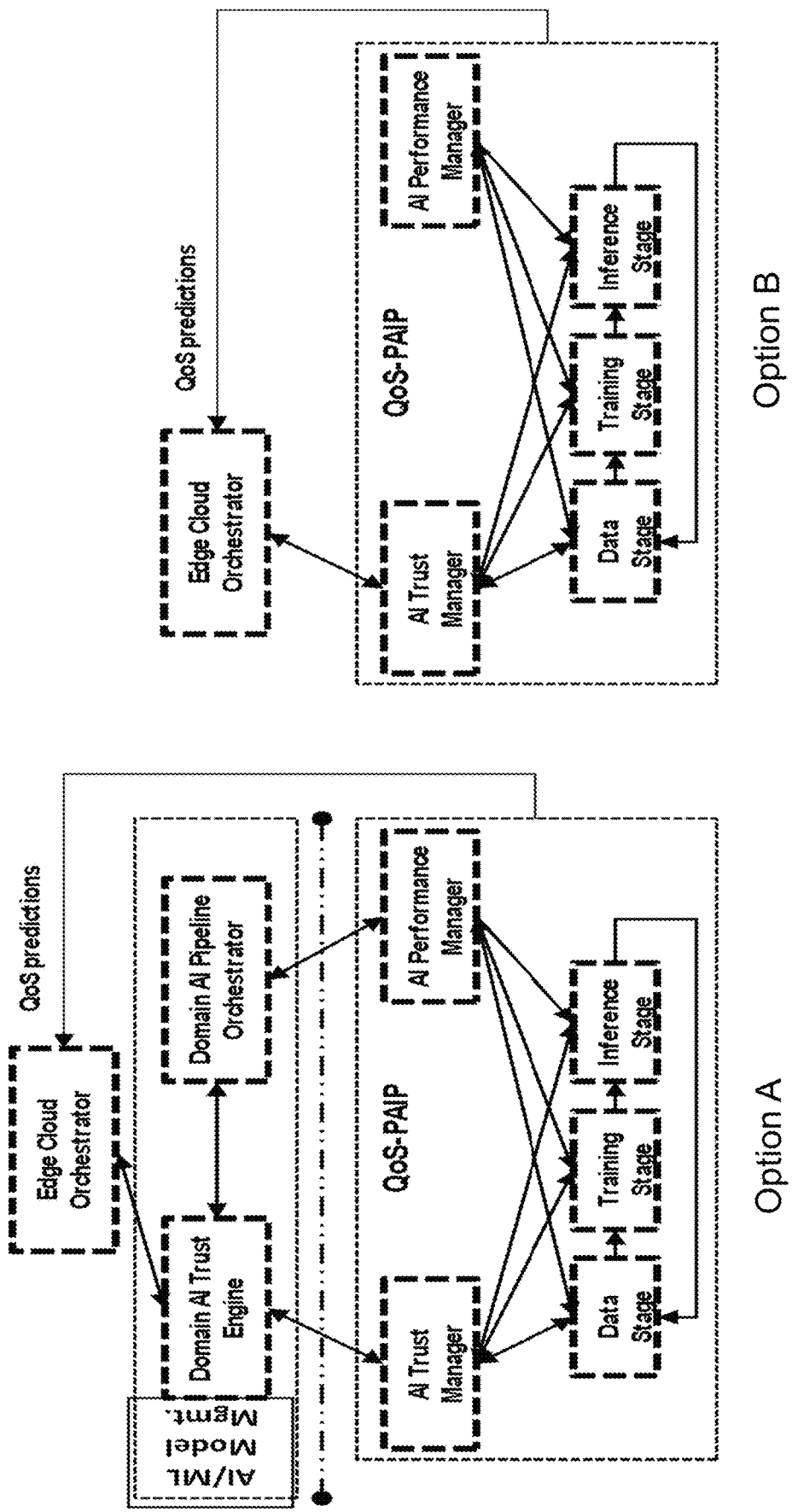
FIG. 20 shows a shows a schematic diagram of another examples of system environments with signaling variants according to example embodiments.

FIG. 20 shows a shows a schematic diagram of another examples of system environments with signaling variants according to example embodiments, and in particular illustrates two options for an example architecture for the mentioned example use case.

Using the prediction to reliably optimize the offloading requires the ECO to know the reliability and robustness of the predictions to be able to react to known potential issues in them. For this purpose, it may request robustness metrics of the QoS-PAIP either directly from its AI Trust Manager over the T2 interface (Option B in FIG. 20) or from the AI Trust Engine over the T9 interface (Option A in FIG. 20), as shown in FIG. 20. Additionally, the ECO may subscribe to receive AI robustness metrics and events from the QoS-PAIP AI Trust Manager.

If, for example, the instrumentation of one or more of the QoS-PAIP input features has a fault, which leads to increased missing data, which may compromise the accuracy of the QoS predictions, the ECO may detect this either by monitoring the AI robustness metrics or events and decide if it needs to switch to an adapted mode, in the way it is utilizing the QoS-PAIP predictions. It may, for example, choose to ignore the prediction altogether and move to purely reactive algorithm. In this case, some of the related thresholds need to be reconfigured to more conservative values by the ECO to ensure the services being offloaded when the predicted QoS values are not available.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 21:
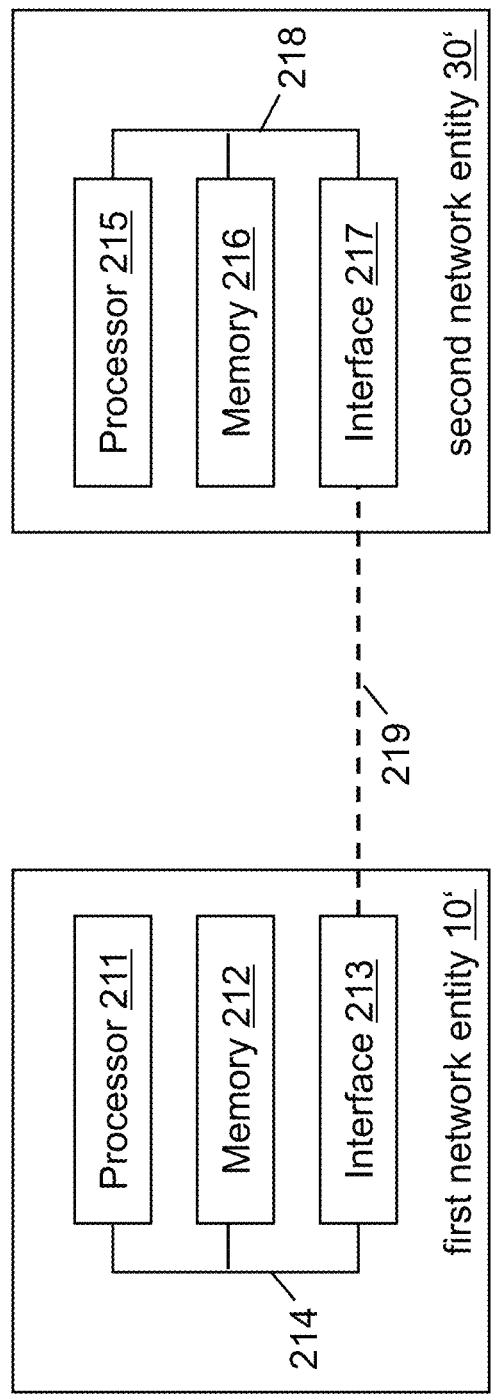
FIG. 21 is a block diagram alternatively illustrating apparatuses according to example embodiments.

In FIG. 21, an alternative illustration of apparatuses according to example embodiments is depicted. As indicated in FIG. 21, according to example embodiments, the apparatus (first network entity) 10' (corresponding to the first network entity 10) comprises a processor 211, a memory 212 and an interface 213, which are connected by a bus 214 or the like. Further, according to example embodiments, the apparatus (second network entity) 30' (corresponding to the second network entity 30) comprises a processor 215, a memory 216 and an interface 217, which are connected by a bus 218 or the like, and the apparatuses may be connected via link 219, respectively.

The processor 211/215 and/or the interface 213/217 may also include a modem or the like to facilitate communication over a (hardwire or wireless) link, respectively. The interface 213/217 may include a suitable transceiver coupled to one or more antennas or communication means for (hardwire or wireless) communications with the linked or connected device(s), respectively. The interface 213/217 is generally configured to communicate with at least one other apparatus, i.e. the interface thereof.

The memory 212/216 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the first network entity 10 (e.g. managing artificial intelligence or machine learning trustworthiness in a network) comprises at least one processor 211, at least one memory 212 including computer program code, and at least one interface 213 configured for communication with at least another apparatus. The processor (i.e. the at least one processor 211, with the at least one memory 212 and the computer program code) is configured to perform transmitting a first artificial intelligence or machine learning trustworthiness related message towards a second network entity managing artificial intelligence or machine learning trustworthiness in an artificial intelligence or machine learning pipeline in said network (thus the apparatus comprising corresponding means for transmitting), and to perform receiving a second artificial intelligence or machine learning trustworthiness related message from said second network entity, wherein said first artificial intelligence or machine learning trustworthiness related message includes at least one criterion related to an artificial intelligence or machine learning trustworthiness aspect (thus the apparatus comprising corresponding means for receiving).

According to example embodiments, an apparatus representing the second network entity 30 (e.g. managing artificial intelligence or machine learning trustworthiness in an artificial intelligence or machine learning pipeline in a network) comprises at least one processor 215, at least one memory 216 including computer program code, and at least one interface 217 configured for communication with at least another apparatus. The processor (i.e. the at least one processor 215, with the at least one memory 216 and the computer program code) is configured to perform receiving a first artificial intelligence or machine learning trustworthiness related message from a first network entity managing artificial intelligence or machine learning trustworthiness in said network (thus the apparatus comprising corresponding means for receiving), and to perform transmitting a second artificial intelligence or machine learning trustworthiness related message towards said first network entity, wherein said first artificial intelligence or machine learning trustworthiness related message includes at least one criterion related to an artificial intelligence or machine learning trustworthiness aspect (thus the apparatus comprising corresponding means for transmitting).

For further details regarding the operability/functionality of the individual apparatuses, reference is made to the above description in connection with any one of FIGS. 1 to 20, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for trust related management of artificial intelligence or machine learning pipelines. Such measures exemplarily comprise, at a first network entity managing artificial intelligence or machine learning trustworthiness in a network, transmitting a first artificial intelligence or machine learning trustworthiness related message towards a second network entity managing artificial intelligence or machine learning trustworthiness in an artificial intelligence or machine learning pipeline in said network, and receiving a second artificial intelligence or machine learning trustworthiness related message from said second network entity, wherein said first artificial intelligence or machine learning trustworthiness related message includes at least one criterion related to an artificial intelligence or machine learning trustworthiness aspect.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

The following aspects can be derived from the above description of example embodiments.

Aspect 1. A method of a first network entity managing artificial intelligence or machine learning trustworthiness in a network, the method comprising
transmitting a first artificial intelligence or machine learning trustworthiness related message towards a second network entity managing artificial intelligence or machine learning trustworthiness in an artificial intelligence or machine learning pipeline in said network, and
receiving a second artificial intelligence or machine learning trustworthiness related message from said second network entity, wherein
said first artificial intelligence or machine learning trustworthiness related message includes at least one criterion related to an artificial intelligence or machine learning trustworthiness aspect.

Aspect 2. The method according to aspect 1, wherein
said at least one criterion is embedded in a first format specific to said artificial intelligence or machine learning trustworthiness aspect.

Aspect 3. The method according to aspect 1 or 2, wherein
said artificial intelligence or machine learning trustworthiness aspect is one trustworthiness factor of artificial intelligence or machine learning model fairness, artificial intelligence or machine learning model explainability, and artificial intelligence or machine learning model robustness.

Aspect 4. The method according to any of aspects 1 to 3, further comprising
translating an acquired artificial intelligence or machine learning quality of trustworthiness into requirements related to said artificial intelligence or machine learning trustworthiness aspect, and
identifying said second network entity based on said acquired artificial intelligence or machine learning quality of trustworthiness, wherein
said first artificial intelligence or machine learning trustworthiness related message is a trustworthiness capability information request, and
said second artificial intelligence or machine learning trustworthiness related message is a trustworthiness capability information response.

Aspect 5. The method according to aspect 4, wherein
said first artificial intelligence or machine learning trustworthiness related message includes scope information,
said second artificial intelligence or machine learning trustworthiness related message includes capability information with respect to said artificial intelligence or machine learning trustworthiness aspect indicative of said artificial intelligence or machine learning pipeline, and
said capability information with respect to said artificial intelligence or machine learning trustworthiness aspect is embedded in a second format specific to said artificial intelligence or machine learning trustworthiness aspect.

Aspect 6. The method according to aspect 4 or 5, wherein
said first format specific to said artificial intelligence or machine learning trustworthiness aspect is a manager object instance specific to said artificial intelligence or machine learning trustworthiness aspect, and/or
said second format specific to said artificial intelligence or machine learning trustworthiness aspect is a capability information object class specific to said artificial intelligence or machine learning trustworthiness aspect.

Aspect 7. The method according to any of aspects 1 to 3, further comprising
determining, based on acquired capability information with respect to said artificial intelligence or machine learning trustworthiness aspect, whether requirements related to said artificial intelligence or machine learning trustworthiness aspect can be satisfied, wherein
said first artificial intelligence or machine learning trustworthiness related message is a trustworthiness configuration request, and
said second artificial intelligence or machine learning trustworthiness related message is a trustworthiness configuration response.

Aspect 8. The method according to aspect 7, wherein
said first artificial intelligence or machine learning trustworthiness related message includes scope information, and
said second artificial intelligence or machine learning trustworthiness related message includes success information indicative of success or non-success of a configuration based on said trustworthiness configuration request.

Aspect 9. The method according to aspect 7 or 8, wherein
said first format specific to said artificial intelligence or machine learning trustworthiness aspect is a manager object instance specific to said artificial intelligence or machine learning trustworthiness aspect.

Aspect 10. The method according to any of aspects 1 to 3, further comprising
determining said second network entity based on an acquired trustworthiness information demand, wherein
said first artificial intelligence or machine learning trustworthiness related message is a trustworthiness report request, and
said second artificial intelligence or machine learning trustworthiness related message is a trustworthiness report response.

Aspect 11. The method according to any of aspects 1 to 3, further comprising
determining said second network entity based on an acquired trustworthiness information demand, wherein
said first artificial intelligence or machine learning trustworthiness related message is a trustworthiness report subscription, and
said second artificial intelligence or machine learning trustworthiness related message is a trustworthiness report notification.

Aspect 12. The method according to aspect 10 or 11, wherein
said second artificial intelligence or machine learning trustworthiness related message includes an aggregation of data related to said artificial intelligence or machine learning trustworthiness aspect indicative of said artificial intelligence or machine learning pipeline, and said aggregation is embedded in a second format specific to said artificial intelligence or machine learning trustworthiness aspect.

Aspect 13. The method according to any of aspects 10 to 12, wherein
said first format specific to said artificial intelligence or machine learning trustworthiness aspect is a first information object class specific to said artificial intelligence or machine learning trustworthiness aspect, and/or
said second format specific to said artificial intelligence or machine learning trustworthiness aspect is a second information object class specific to said artificial intelligence or machine learning trustworthiness aspect.

Aspect 14. The method according to any of aspects 1 to 13, wherein
said first artificial intelligence or machine learning trustworthiness related message is related to artificial intelligence or machine learning model technical robustness as a trustworthiness sub-factor,
said second artificial intelligence or machine learning trustworthiness related message is related to artificial intelligence or machine learning model technical robustness as said trustworthiness sub-factor, and
said first artificial intelligence or machine learning trustworthiness related message comprises a first information element including at least one first artificial intelligence or machine learning model technical robustness related parameter.

Aspect 15. The method according to aspect 14, wherein
said first artificial intelligence or machine learning trustworthiness related message is a trustworthiness technical robustness capability information request, and
said second artificial intelligence or machine learning trustworthiness related message is a trustworthiness technical robustness capability information response, and
said second artificial intelligence or machine learning trustworthiness related message comprises a second information element including at least one second artificial intelligence or machine learning model technical robustness related parameter.

Aspect 16. The method according to aspect 15, wherein
said at least one first artificial intelligence or machine learning model technical robustness related parameter includes at least one of
first scope information indicative of at least one artificial intelligence or machine learning pipeline to which said trustworthiness technical robustness capability information request relates, and
first phase information indicative of at least one artificial intelligence or machine learning pipeline phase to which said trustworthiness technical robustness capability information request relates, and
said at least one second artificial intelligence or machine learning model technical robustness related parameter includes at least one capability entry, wherein each respective capability entry of said at least one capability entry includes at least one of
second scope information indicative of an artificial intelligence or machine learning pipeline to which said respective capability entry relates,
second phase information indicative of at least one artificial intelligence or machine learning pipeline phase to which said respective capability entry relates,
missing data handling information indicative of at least one missing data handling method supported for said at least one artificial intelligence or machine learning pipeline phase of said artificial intelligence or machine learning pipeline to which said respective capability entry relates,
missing data metrics information indicative of at least one missing data metric supported for said at least one artificial intelligence or machine learning pipeline phase of said artificial intelligence or machine learning pipeline to which said respective capability entry relates,
concept drift detection information indicative of at least one concept drift detection method supported for said at least one artificial intelligence or machine learning pipeline phase of said artificial intelligence or machine learning pipeline to which said respective capability entry relates,
concept drift metrics information indicative of at least one concept drift metric supported for said at least one artificial intelligence or machine learning pipeline phase of said artificial intelligence or machine learning pipeline to which said respective capability entry relates,
concept drift adaptation information indicative of at least one concept drift adaptation method supported for said at least one artificial intelligence or machine learning pipeline phase of said artificial intelligence or machine learning pipeline to which said respective capability entry relates,
event information indicative of at least one artificial intelligence or machine learning technical robustness event supported for said at least one artificial intelligence or machine learning pipeline phase of said artificial intelligence or machine learning pipeline to which said respective capability entry relates,
artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and
artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

Aspect 17. The method according to aspect 14, wherein
said first artificial intelligence or machine learning trustworthiness related message is a trustworthiness technical robustness configuration request, and
said second artificial intelligence or machine learning trustworthiness related message is a trustworthiness technical robustness configuration response.

Aspect 18. The method according to aspect 17, wherein
said at least one first artificial intelligence or machine learning model technical robustness related parameter includes at least one configuration entry, wherein each respective configuration entry of said at least one configuration entry includes at least one of
scope information indicative of an artificial intelligence or machine learning pipeline to which said respective configuration entry relates, phase information indicative of at least one artificial intelligence or machine learning pipeline phase to which said respective configuration entry relates, missing data handling information indicative of at least one missing data handling method demanded for said at least one artificial intelligence or machine learning pipeline phase of said artificial intelligence or machine learning pipeline to which said respective configuration entry relates, concept drift detection information indicative of at least one concept drift detection method demanded for said at least one artificial intelligence or machine learning pipeline phase of said artificial intelligence or machine learning pipeline to which said respective configuration entry relates, concept drift adaptation information indicative of at least one concept drift adaptation method demanded for said at least one artificial intelligence or machine learning pipeline phase of said artificial intelligence or machine learning pipeline to which said respective configuration entry relates, artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and event trigger information indicative of at least one event trigger condition for triggering at least one artificial intelligence or machine learning technical robustness event.

Aspect 19. The method according to aspect 17 or 18, wherein said trustworthiness technical robustness configuration response includes information on an operational state and/or operational status of at least one configuration target of said trustworthiness technical robustness configuration request.

Aspect 20. The method according to any of aspects 17 to 19, further comprising transmitting a third artificial intelligence or machine learning trustworthiness related message towards said second network entity, and receiving a fourth artificial intelligence or machine learning trustworthiness related message from said second network entity, wherein said third artificial intelligence or machine learning trustworthiness related message is a trustworthiness technical robustness measurement configuration request, and said fourth artificial intelligence or machine learning trustworthiness related message is a trustworthiness technical robustness measurement configuration response, wherein said third artificial intelligence or machine learning trustworthiness related message is related to artificial intelligence or machine learning model technical robustness as said trustworthiness sub-factor, said fourth artificial intelligence or machine learning trustworthiness related message is related to artificial intelligence or machine learning model technical robustness as said trustworthiness sub-factor, said third artificial intelligence or machine learning trustworthiness related message comprises a third information element including at least one third artificial intelligence or machine learning model technical robustness related parameter, and said fourth artificial intelligence or machine learning trustworthiness related message comprises a fourth information element including at least one fourth artificial intelligence or machine learning model technical robustness related parameter.

Aspect 21. The method according to aspect 20, wherein said at least one third artificial intelligence or machine learning model technical robustness related parameter includes at least one measurement configuration entry, wherein each respective measurement configuration entry of said at least one measurement configuration entry includes at least one of scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and frequency information indicative of at least one measurement frequency for said at least one artificial intelligence or machine learning pipeline phase of said artificial intelligence or machine learning pipeline to which said respective capability entry relates.

Aspect 22. The method according aspect 14, wherein said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

Aspect 23. The method according to aspect 22, wherein said at least one first artificial intelligence or machine learning model technical robustness related parameter includes at least one of scope information indicative of an artificial intelligence or machine learning pipeline to which said trustworthiness technical robustness report request relates, phase information indicative of at least one artificial intelligence or machine learning pipeline phase to which said trustworthiness technical robustness report request relates, a list indicative of technical robustness metrics demanded to be reported, start time information indicative of a begin of a timeframe for which reporting is demanded with said trustworthiness technical robustness report request, and stop time information indicative of an end of said timeframe for which reporting is demanded with said trustworthiness technical robustness report request, and said at least one second artificial intelligence or machine learning model technical robustness related parameter includes demanded technical robustness metrics.

Aspect 24. The method according to aspect 14, wherein said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

Aspect 25. The method according to aspect 24, wherein said at least one first artificial intelligence or machine learning model technical robustness related parameter includes at least one of scope information indicative of an artificial intelligence or machine learning pipeline to which said trustworthiness technical robustness subscription relates, phase information indicative of at least one artificial intelligence or machine learning pipeline phase to which said trustworthiness technical robustness subscription relates, a list indicative of technical robustness metrics demanded to be reported, and technical robustness metrics filter information indicative of a filter to by applied to said technical robustness metrics demanded to be reported, and said at least one second artificial intelligence or machine learning model technical robustness related parameter includes demanded technical robustness metrics.

Aspect 26. The method according to aspect 14, wherein said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

Aspect 27. The method according to aspect 26, wherein said trustworthiness technical robustness event notification includes information on a triggered configured artificial intelligence or machine learning technical robustness event.

Aspect 28. A method of a second network entity managing artificial intelligence or machine learning trustworthiness in an artificial intelligence or machine learning pipeline in a network, the method comprising receiving a first artificial intelligence or machine learning trustworthiness related message from a first network entity managing artificial intelligence or machine learning trustworthiness in said network, and transmitting a second artificial intelligence or machine learning trustworthiness related message towards said first network entity, wherein said first artificial intelligence or machine learning trustworthiness related message includes at least one criterion related to an artificial intelligence or machine learning trustworthiness aspect.

Aspect 29. The method according to aspect 28, wherein said at least one criterion is embedded in a first format specific to said artificial intelligence or machine learning trustworthiness aspect.

Aspect 30. The method according to aspect 28 or 29, wherein said artificial intelligence or machine learning trustworthiness aspect is one trustworthiness factor of artificial intelligence or machine learning model fairness, artificial intelligence or machine learning model explainability, and artificial intelligence or machine learning model robustness.

Aspect 31. The method according to any of aspects 28 to 30, wherein said first artificial intelligence or machine learning trustworthiness related message is a trustworthiness capability information request, and said second artificial intelligence or machine learning trustworthiness related message is a trustworthiness capability information response.

Aspect 32. The method according to aspect 31, further comprising acquiring capability information with respect to said artificial intelligence or machine learning trustworthiness aspect within said artificial intelligence or machine learning pipeline, wherein said first artificial intelligence or machine learning trustworthiness related message includes scope information, said second artificial intelligence or machine learning trustworthiness related message includes said capability information with respect to said artificial intelligence or machine learning trustworthiness aspect indicative of said artificial intelligence or machine learning pipeline, and said capability information with respect to said artificial intelligence or machine learning trustworthiness aspect is embedded in a second format specific to said artificial intelligence or machine learning trustworthiness aspect.

Aspect 33. The method according to aspect 31 or 32, wherein said first format specific to said artificial intelligence or machine learning trustworthiness aspect is a manager object instance specific to said artificial intelligence or machine learning trustworthiness aspect, and/or said second format specific to said artificial intelligence or machine learning trustworthiness aspect is a capability information object class specific to said artificial intelligence or machine learning trustworthiness aspect.

Aspect 34. The method according to any of aspects 28 to 30, wherein said first artificial intelligence or machine learning trustworthiness related message is a trustworthiness configuration request, and said second artificial intelligence or machine learning trustworthiness related message is a trustworthiness configuration response.

Aspect 35. The method according to aspect 34, further comprising
- controlling a configuration within said artificial intelligence or machine learning pipeline based on said trustworthiness configuration request, wherein
- said first artificial intelligence or machine learning trustworthiness related message includes scope information, and
- said second artificial intelligence or machine learning trustworthiness related message includes success information indicative of success or non-success of said configuration based on said trustworthiness configuration request.

Aspect 36. The method according to aspect 34 or 35, wherein
- said first format specific to said artificial intelligence or machine learning trustworthiness aspect is a manager object instance specific to said artificial intelligence or machine learning trustworthiness aspect.

Aspect 37. The method according to any of aspects 28 to 30, wherein
- said first artificial intelligence or machine learning trustworthiness related message is a trustworthiness report request, and
- said second artificial intelligence or machine learning trustworthiness related message is a trustworthiness report response.

Aspect 38. The method according to any of aspects 28 to 30, wherein
- said first artificial intelligence or machine learning trustworthiness related message is a trustworthiness report subscription, and
- said second artificial intelligence or machine learning trustworthiness related message is a trustworthiness report notification.

Aspect 39. The method according to aspect 37 or 38, further comprising
- acquiring collected and aggregated data within said artificial intelligence or machine learning pipeline as an aggregation of data related to said artificial intelligence or machine learning trustworthiness aspect, wherein
- said second artificial intelligence or machine learning trustworthiness related message includes said aggregation of data related to said artificial intelligence or machine learning trustworthiness aspect indicative of said artificial intelligence or machine learning pipeline, and
- said aggregation is embedded in a second format specific to said artificial intelligence or machine learning trustworthiness aspect.

Aspect 40. The method according to any of aspects 37 to 39, wherein
- said first format specific to said artificial intelligence or machine learning trustworthiness aspect is a first information object class specific to said artificial intelligence or machine learning trustworthiness aspect, and/or
- said second format specific to said artificial intelligence or machine learning trustworthiness aspect is a second information object class specific to said artificial intelligence or machine learning trustworthiness aspect.

Aspect 41. The method according to any of aspects 28 to 40, wherein
- said first artificial intelligence or machine learning trustworthiness related message is related to artificial intelligence or machine learning model technical robustness as a trustworthiness sub-factor,
- said second artificial intelligence or machine learning trustworthiness related message is related to artificial intelligence or machine learning model technical robustness as said trustworthiness sub-factor, and
- said first artificial intelligence or machine learning trustworthiness related message comprises a first information element including at least one first artificial intelligence or machine learning model technical robustness related parameter.

Aspect 42. The method according to aspect 41, wherein
- said first artificial intelligence or machine learning trustworthiness related message is a trustworthiness technical robustness capability information request, and
- said second artificial intelligence or machine learning trustworthiness related message is a trustworthiness technical robustness capability information response, and
- said second artificial intelligence or machine learning trustworthiness related message comprises a second information element including at least one second artificial intelligence or machine learning model technical robustness related parameter.

Aspect 43. The method according to aspect 42, wherein
- said at least one first artificial intelligence or machine learning model technical robustness related parameter includes at least one of
  - first scope information indicative of at least one artificial intelligence or machine learning pipeline to which said trustworthiness technical robustness capability information request relates, and
  - first phase information indicative of at least one artificial intelligence or machine learning pipeline phase to which said trustworthiness technical robustness capability information request relates, and
- said at least one second artificial intelligence or machine learning model technical robustness related parameter includes at least one capability entry, wherein each respective capability entry of said at least one capability entry includes at least one of
  - second scope information indicative of an artificial intelligence or machine learning pipeline to which said respective capability entry relates,
  - second phase information indicative of at least one artificial intelligence or machine learning pipeline phase to which said respective capability entry relates,
  - missing data handling information indicative of at least one missing data handling method supported for said at least one artificial intelligence or machine learning pipeline phase of said artificial intelligence or machine learning pipeline to which said respective capability entry relates,
  - missing data metrics information indicative of at least one missing data metric supported for said at least one artificial intelligence or machine learning pipeline phase of said artificial intelligence or machine learning pipeline to which said respective capability entry relates,
  - concept drift detection information indicative of at least one concept drift detection method supported for said at least one artificial intelligence or machine learning pipeline phase of said artificial intelligence or machine learning pipeline to which said respective capability entry relates,
  - concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

Aspect 44. The method according to aspect 41, wherein
said first artificial intelligence or machine learning trustworthiness related message is a trustworthiness technical robustness configuration request, and
said second artificial intelligence or machine learning trustworthiness related message is a trustworthiness technical robustness configuration response.

Aspect 45. The method according to aspect 44, wherein
said at least one first artificial intelligence or machine learning model technical robustness related parameter includes at least one configuration entry, wherein each respective configuration entry of said at least one configuration entry includes at least one of
scope information indicative of an artificial intelligence or machine learning pipeline to which said respective configuration entry relates,
phase information indicative of at least one artificial intelligence or machine learning pipeline phase to which said respective configuration entry relates,
missing data handling information indicative of at least one missing data handling method demanded for said at least one artificial intelligence or machine learning pipeline phase of said artificial intelligence or machine learning pipeline to which said respective configuration entry relates,
concept drift detection information indicative of at least one concept drift detection method demanded for said at least one artificial intelligence or machine learning pipeline phase of said artificial intelligence or machine learning pipeline to which said respective configuration entry relates,
concept drift adaptation information indicative of at least one concept drift adaptation method demanded for said at least one artificial intelligence or machine learning pipeline phase of said artificial intelligence or machine learning pipeline to which said respective configuration entry relates,
artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and
event trigger information indicative of at least one event trigger condition for triggering at least one artificial intelligence or machine learning technical robustness event.

Aspect 46. The method according to aspect 44 or 45, wherein
said trustworthiness technical robustness configuration response includes information on an operational state and/or operational status of at least one configuration target of said trustworthiness technical robustness configuration request.

Aspect 47. The method according to any of aspects 44 to 46, further comprising
receiving a third artificial intelligence or machine learning trustworthiness related message from said first network entity, and
transmitting a fourth artificial intelligence or machine learning trustworthiness related message towards said first network entity, wherein
said third artificial intelligence or machine learning trustworthiness related message is a trustworthiness technical robustness measurement configuration request, and
said fourth artificial intelligence or machine learning trustworthiness related message is a trustworthiness technical robustness measurement configuration response, wherein
said third artificial intelligence or machine learning trustworthiness related message is related to artificial intelligence or machine learning model technical robustness as said trustworthiness sub-factor,
said fourth artificial intelligence or machine learning trustworthiness related message is related to artificial intelligence or machine learning model technical robustness as said trustworthiness sub-factor,
said third artificial intelligence or machine learning trustworthiness related message comprises a third information element including at least one third artificial intelligence or machine learning model technical robustness related parameter, and
said fourth artificial intelligence or machine learning trustworthiness related message comprises a fourth information element including at least one fourth artificial intelligence or machine learning model technical robustness related parameter.

Aspect 48. The method according to aspect 47, wherein
said at least one third artificial intelligence or machine learning model technical robustness related parameter includes at least one measurement configuration entry, wherein each respective measurement configuration entry of said at least one measurement configuration entry includes at least one of
scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and frequency information indicative of at least one measurement frequency for said at least one artificial intelligence or machine learning pipeline phase of said artificial intelligence or machine learning pipeline to which said respective capability entry relates.

Aspect 49. The method according to aspect 41, wherein
said first artificial intelligence or machine learning trustworthiness related message is a trustworthiness technical robustness report request, and
said second artificial intelligence or machine learning trustworthiness related message is a trustworthiness technical robustness report response, and
said second artificial intelligence or machine learning trustworthiness related message comprises a second information element including at least one second artificial intelligence or machine learning model technical robustness related parameter.

Aspect 50. The method according to aspect 49, wherein
said at least one first artificial intelligence or machine learning model technical robustness related parameter includes at least one of
scope information indicative of an artificial intelligence or machine learning pipeline to which said trustworthiness technical robustness report request relates,
phase information indicative of at least one artificial intelligence or machine learning pipeline phase to which said trustworthiness technical robustness report request relates,
a list indicative of technical robustness metrics demanded to be reported,
start time information indicative of a begin of a timeframe for which reporting is demanded with said trustworthiness technical robustness report request, and
stop time information indicative of an end of said timeframe for which reporting is demanded with said trustworthiness technical robustness report request, and
said at least one second artificial intelligence or machine learning model technical robustness related parameter includes
demanded technical robustness metrics.

Aspect 51. The method according to aspect 41, wherein
said first artificial intelligence or machine learning trustworthiness related message is a trustworthiness technical robustness subscription,
said second artificial intelligence or machine learning trustworthiness related message is a trustworthiness technical robustness notification, and
said second artificial intelligence or machine learning trustworthiness related message comprises a second information element including at least one second artificial intelligence or machine learning model technical robustness related parameter.

Aspect 52. The method according to aspect 51, wherein
said at least one first artificial intelligence or machine learning model technical robustness related parameter includes at least one of
scope information indicative of an artificial intelligence or machine learning pipeline to which said trustworthiness technical robustness subscription relates,
phase information indicative of at least one artificial intelligence or machine learning pipeline phase to which said trustworthiness technical robustness subscription relates,
a list indicative of technical robustness metrics demanded to be reported, and
technical robustness metrics filter information indicative of a filter to by applied to said technical robustness metrics demanded to be reported, and
said at least one second artificial intelligence or machine learning model technical robustness related parameter includes
demanded technical robustness metrics.

Aspect 53. The method according to aspect 41, wherein
said first artificial intelligence or machine learning trustworthiness related message is a trustworthiness technical robustness event subscription for subscribing to any triggered configured artificial intelligence or machine learning technical robustness event, and
said second artificial intelligence or machine learning trustworthiness related message is a trustworthiness technical robustness event notification.

Aspect 54. The method according to aspect 53, wherein
said trustworthiness technical robustness event notification includes
information on a triggered configured artificial intelligence or machine learning technical robustness event.

Aspect 55. An apparatus of a first network entity managing artificial intelligence or machine learning trustworthiness in a network, the apparatus comprising
at least one processor,
at least one memory including computer program code, and
at least one interface configured for communication with at least another apparatus,
the at least one processor, with the at least one memory and the computer program code, being configured to cause the apparatus to perform:
transmitting a first artificial intelligence or machine learning trustworthiness related message towards a second network entity managing artificial intelligence or machine learning trustworthiness in an artificial intelligence or machine learning pipeline in said network, and
receiving a second artificial intelligence or machine learning trustworthiness related message from said second network entity, wherein
said first artificial intelligence or machine learning trustworthiness related message includes at least one criterion related to an artificial intelligence or machine learning trustworthiness aspect.

Aspect 56. The apparatus according to aspect 55, wherein
said at least one criterion is embedded in a first format specific to said artificial intelligence or machine learning trustworthiness aspect.

Aspect 57. The apparatus according to aspect 55 or 56, wherein
said artificial intelligence or machine learning trustworthiness aspect is one trustworthiness factor of artificial intelligence or machine learning model fairness, artificial intelligence or machine learning model explainability, and artificial intelligence or machine learning model robustness.

Aspect 58. The apparatus according to any of aspects 55 to 57, wherein
the at least one processor, with the at least one memory and the computer program code, being configured to cause the apparatus to perform:
translating an acquired artificial intelligence or machine learning quality of trustworthiness into requirements related to said artificial intelligence or machine learning trustworthiness aspect, and
identifying said second network entity based on said acquired artificial intelligence or machine learning quality of trustworthiness, wherein
said first artificial intelligence or machine learning trustworthiness related message is a trustworthiness capability information request, and
said second artificial intelligence or machine learning trustworthiness related message is a trustworthiness capability information response.

Aspect 59. The apparatus according to aspect 58, wherein
said first artificial intelligence or machine learning trustworthiness related message includes scope information,
said second artificial intelligence or machine learning trustworthiness related message includes capability information with respect to said artificial intelligence or machine learning trustworthiness aspect indicative of said artificial intelligence or machine learning pipeline, and
said capability information with respect to said artificial intelligence or machine learning trustworthiness aspect is embedded in a second format specific to said artificial intelligence or machine learning trustworthiness aspect.

Aspect 60. The apparatus according to aspect 58 or 59, wherein
said first format specific to said artificial intelligence or machine learning trustworthiness aspect is a manager object instance specific to said artificial intelligence or machine learning trustworthiness aspect, and/or
said second format specific to said artificial intelligence or machine learning trustworthiness aspect is a capability information object class specific to said artificial intelligence or machine learning trustworthiness aspect.

Aspect 61. The apparatus according to any of aspects 55 to 57, wherein
the at least one processor, with the at least one memory and the computer program code, being configured to cause the apparatus to perform:
determining, based on acquired capability information with respect to said artificial intelligence or machine learning trustworthiness aspect, whether requirements related to said artificial intelligence or machine learning trustworthiness aspect can be satisfied, wherein
said first artificial intelligence or machine learning trustworthiness related message is a trustworthiness configuration request, and
said second artificial intelligence or machine learning trustworthiness related message is a trustworthiness configuration response.

Aspect 62. The apparatus according to aspect 61, wherein
said first artificial intelligence or machine learning trustworthiness related message includes scope information, and
said second artificial intelligence or machine learning trustworthiness related message includes success information indicative of success or non-success of a configuration based on said trustworthiness configuration request.

Aspect 63. The apparatus according to aspect 61 or 62, wherein
said first format specific to said artificial intelligence or machine learning trustworthiness aspect is a manager object instance specific to said artificial intelligence or machine learning trustworthiness aspect.

Aspect 64. The apparatus according to any of aspects 55 to 57, wherein
the at least one processor, with the at least one memory and the computer program code, being configured to cause the apparatus to perform:
determining said second network entity based on an acquired trustworthiness information demand, wherein
said first artificial intelligence or machine learning trustworthiness related message is a trustworthiness report request, and
said second artificial intelligence or machine learning trustworthiness related message is a trustworthiness report response.

Aspect 65. The apparatus according to any of aspects 55 to 57, wherein
the at least one processor, with the at least one memory and the computer program code, being configured to cause the apparatus to perform:
determining said second network entity based on an acquired trustworthiness information demand, wherein
said first artificial intelligence or machine learning trustworthiness related message is a trustworthiness report subscription, and
said second artificial intelligence or machine learning trustworthiness related message is a trustworthiness report notification.

Aspect 66. The apparatus according to aspect 64 or 65, wherein
said second artificial intelligence or machine learning trustworthiness related message includes an aggregation of data related to said artificial intelligence or machine learning trustworthiness aspect indicative of said artificial intelligence or machine learning pipeline, and
said aggregation is embedded in a second format specific to said artificial intelligence or machine learning trustworthiness aspect.

Aspect 67. The apparatus according to any of aspects 64 to 66, wherein
said first format specific to said artificial intelligence or machine learning trustworthiness aspect is a first information object class specific to said artificial intelligence or machine learning trustworthiness aspect, and/or
said second format specific to said artificial intelligence or machine learning trustworthiness aspect is a second information object class specific to said artificial intelligence or machine learning trustworthiness aspect.

Aspect 68. The apparatus according to any of aspects 55 to 67, wherein
said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

Aspect 69. The apparatus according to aspect 68, wherein said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

Aspect 70. The apparatus according to aspect 69, wherein said at least one first artificial intelligence or machine learning model technical robustness related parameter includes at least one of first scope information indicative of at least one artificial intelligence or machine learning pipeline to which said trustworthiness technical robustness capability information request relates, and first phase information indicative of at least one artificial intelligence or machine learning pipeline phase to which said trustworthiness technical robustness capability information request relates, and said at least one second artificial intelligence or machine learning model technical robustness related parameter includes at least one capability entry, wherein each respective capability entry of said at least one capability entry includes at least one of second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

Aspect 71. The apparatus according to aspect 68, wherein said first artificial intelligence or machine learning trustworthiness related message is a trustworthiness technical robustness configuration request, and said second artificial intelligence or machine learning trustworthiness related message is a trustworthiness technical robustness configuration response.

Aspect 72. The apparatus according to aspect 71, wherein said at least one first artificial intelligence or machine learning model technical robustness related parameter includes at least one configuration entry, wherein each respective configuration entry of said at least one configuration entry includes at least one of scope information indicative of an artificial intelligence or machine learning pipeline to which said respective configuration entry relates, phase information indicative of at least one artificial intelligence or machine learning pipeline phase to which said respective configuration entry relates, missing data handling information indicative of at least one missing data handling method demanded for said at least one artificial intelligence or machine learning pipeline phase of said artificial intelligence or machine learning pipeline to which said respective configuration entry relates, concept drift detection information indicative of at least one concept drift detection method demanded for said at least one artificial intelligence or machine learning pipeline phase of said artificial intelligence or machine learning pipeline to which said respective configuration entry relates, concept drift adaptation information indicative of at least one concept drift adaptation method demanded for said at least one artificial intelligence or machine learning pipeline phase of said artificial intelligence or machine learning pipeline to which said respective configuration entry relates, artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and event trigger information indicative of at least one event trigger condition for triggering at least one artificial intelligence or machine learning technical robustness event.

Aspect 73. The apparatus according to aspect 71 or 72, wherein said trustworthiness technical robustness configuration response includes information on an operational state and/or operational status of at least one configuration target of said trustworthiness technical robustness configuration request.

Aspect 74. The apparatus according to any of aspects 71 to 73, wherein the at least one processor, with the at least one memory and the computer program code, being configured to cause the apparatus to perform:

transmitting a third artificial intelligence or machine learning trustworthiness related message towards said second network entity, and receiving a fourth artificial intelligence or machine learning trustworthiness related message from said second network entity, wherein said third artificial intelligence or machine learning trustworthiness related message is a trustworthiness technical robustness measurement configuration request, and said fourth artificial intelligence or machine learning trustworthiness related message is a trustworthiness technical robustness measurement configuration response, wherein said third artificial intelligence or machine learning trustworthiness related message is related to artificial intelligence or machine learning model technical robustness as said trustworthiness sub-factor, said fourth artificial intelligence or machine learning trustworthiness related message is related to artificial intelligence or machine learning model technical robustness as said trustworthiness sub-factor, said third artificial intelligence or machine learning trustworthiness related message comprises a third information element including at least one third artificial intelligence or machine learning model technical robustness related parameter, and said fourth artificial intelligence or machine learning trustworthiness related message comprises a fourth information element including at least one fourth artificial intelligence or machine learning model technical robustness related parameter.

Aspect 75. The apparatus according to aspect 74, wherein said at least one third artificial intelligence or machine learning model technical robustness related parameter includes at least one measurement configuration entry, wherein each respective measurement configuration entry of said at least one measurement configuration entry includes at least one of scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and frequency information indicative of at least one measurement frequency for said at least one artificial intelligence or machine learning pipeline phase of said artificial intelligence or machine learning pipeline to which said respective capability entry relates.

Aspect 76. The apparatus according to aspect 68, wherein said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

Aspect 77. The apparatus according to aspect 76, wherein said at least one first artificial intelligence or machine learning model technical robustness related parameter includes at least one of scope information indicative of an artificial intelligence or machine learning pipeline to which said trustworthiness technical robustness report request relates, phase information indicative of at least one artificial intelligence or machine learning pipeline phase to which said trustworthiness technical robustness report request relates, a list indicative of technical robustness metrics demanded to be reported, start time information indicative of a begin of a timeframe for which reporting is demanded with said trustworthiness technical robustness report request, and stop time information indicative of an end of said timeframe for which reporting is demanded with said trustworthiness technical robustness report request, and said at least one second artificial intelligence or machine learning model technical robustness related parameter includes demanded technical robustness metrics.

Aspect 78. The apparatus according to aspect 68, wherein said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

Aspect 79. The apparatus according to aspect 78, wherein
said at least one first artificial intelligence or machine learning model technical robustness related parameter includes at least one of
scope information indicative of an artificial intelligence or machine learning pipeline to which said trustworthiness technical robustness subscription relates,
phase information indicative of at least one artificial intelligence or machine learning pipeline phase to which said trustworthiness technical robustness subscription relates,
a list indicative of technical robustness metrics demanded to be reported, and
technical robustness metrics filter information indicative of a filter to by applied to said technical robustness metrics demanded to be reported, and
said at least one second artificial intelligence or machine learning model technical robustness related parameter includes
demanded technical robustness metrics.

Aspect 80. The apparatus according to aspect 68, wherein
said first artificial intelligence or machine learning trustworthiness related message is a trustworthiness technical robustness event subscription for subscribing to any triggered configured artificial intelligence or machine learning technical robustness event, and
said second artificial intelligence or machine learning trustworthiness related message is a trustworthiness technical robustness event notification.

Aspect 81. The apparatus according to aspect 80, wherein
said trustworthiness technical robustness event notification includes
information on a triggered configured artificial intelligence or machine learning technical robustness event.

Aspect 82. An apparatus of a second network entity managing artificial intelligence or machine learning trustworthiness in an artificial intelligence or machine learning pipeline in a network, the apparatus comprising
at least one processor,
at least one memory including computer program code, and
at least one interface configured for communication with at least another apparatus,
the at least one processor, with the at least one memory and the computer program code, being configured to cause the apparatus to perform:
receiving a first artificial intelligence or machine learning trustworthiness related message from a first network entity managing artificial intelligence or machine learning trustworthiness in said network, and
transmitting a second artificial intelligence or machine learning trustworthiness related message towards said first network entity, wherein
said first artificial intelligence or machine learning trustworthiness related message includes at least one criterion related to an artificial intelligence or machine learning trustworthiness aspect.

Aspect 83. The apparatus according to aspect 82, wherein
said at least one criterion is embedded in a first format specific to said artificial intelligence or machine learning trustworthiness aspect.

Aspect 84. The apparatus according to aspect 82 or 83, wherein
said artificial intelligence or machine learning trustworthiness aspect is one trustworthiness factor of artificial intelligence or machine learning model fairness, artificial intelligence or machine learning model explainability, and artificial intelligence or machine learning model robustness.

Aspect 85. The apparatus according to any of aspects 82 to 84, wherein
said first artificial intelligence or machine learning trustworthiness related message is a trustworthiness capability information request, and
said second artificial intelligence or machine learning trustworthiness related message is a trustworthiness capability information response.

Aspect 86. The apparatus according to aspect 85, wherein
the at least one processor, with the at least one memory and the computer program code, being configured to cause the apparatus to perform:
acquiring capability information with respect to said artificial intelligence or machine learning trustworthiness aspect within said artificial intelligence or machine learning pipeline, wherein
said first artificial intelligence or machine learning trustworthiness related message includes scope information,
said second artificial intelligence or machine learning trustworthiness related message includes said capability information with respect to said artificial intelligence or machine learning trustworthiness aspect indicative of said artificial intelligence or machine learning pipeline, and
said capability information with respect to said artificial intelligence or machine learning trustworthiness aspect is embedded in a second format specific to said artificial intelligence or machine learning trustworthiness aspect.

Aspect 87. The apparatus according to aspect 85 or 86, wherein
said first format specific to said artificial intelligence or machine learning trustworthiness aspect is a manager object instance specific to said artificial intelligence or machine learning trustworthiness aspect, and/or
said second format specific to said artificial intelligence or machine learning trustworthiness aspect is a capability information object class specific to said artificial intelligence or machine learning trustworthiness aspect.

Aspect 88. The apparatus according to any of aspects 82 to 84, wherein
said first artificial intelligence or machine learning trustworthiness related message is a trustworthiness configuration request, and
said second artificial intelligence or machine learning trustworthiness related message is a trustworthiness configuration response.

Aspect 89. The apparatus according to aspect 88, wherein
the at least one processor, with the at least one memory and the computer program code, being configured to cause the apparatus to perform:
controlling a configuration within said artificial intelligence or machine learning pipeline based on said trustworthiness configuration request, wherein said first artificial intelligence or machine learning trustworthiness related message includes scope information, and said second artificial intelligence or machine learning trustworthiness related message includes success information indicative of success or non-success of said configuration based on said trustworthiness configuration request.

Aspect 90. The apparatus according to aspect 88 or 89, wherein said first format specific to said artificial intelligence or machine learning trustworthiness aspect is a manager object instance specific to said artificial intelligence or machine learning trustworthiness aspect.

Aspect 91. The apparatus according to any of aspects 82 to 84, wherein said first artificial intelligence or machine learning trustworthiness related message is a trustworthiness report request, and said second artificial intelligence or machine learning trustworthiness related message is a trustworthiness report response.

Aspect 92. The apparatus according to any of aspects 82 to 84, wherein said first artificial intelligence or machine learning trustworthiness related message is a trustworthiness report subscription, and said second artificial intelligence or machine learning trustworthiness related message is a trustworthiness report notification.

Aspect 93. The apparatus according to aspect 91 or 92, wherein the at least one processor, with the at least one memory and the computer program code, being configured to cause the apparatus to perform:

acquiring collected and aggregated data within said artificial intelligence or machine learning pipeline as an aggregation of data related to said artificial intelligence or machine learning trustworthiness aspect, wherein said second artificial intelligence or machine learning trustworthiness related message includes said aggregation of data related to said artificial intelligence or machine learning trustworthiness aspect indicative of said artificial intelligence or machine learning pipeline, and said aggregation is embedded in a second format specific to said artificial intelligence or machine learning trustworthiness aspect.

Aspect 94. The apparatus according to any of aspects 91 to 93, wherein said first format specific to said artificial intelligence or machine learning trustworthiness aspect is a first information object class specific to said artificial intelligence or machine learning trustworthiness aspect, and/or said second format specific to said artificial intelligence or machine learning trustworthiness aspect is a second information object class specific to said artificial intelligence or machine learning trustworthiness aspect.

Aspect 95. The apparatus according to any of aspects 82 to 94, wherein said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

Aspect 96. The apparatus according to aspect 41, wherein said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

Aspect 97. The apparatus according to aspect 96, wherein said at least one first artificial intelligence or machine learning model technical robustness related parameter includes at least one of first scope information indicative of at least one artificial intelligence or machine learning pipeline to which said trustworthiness technical robustness capability information request relates, and first phase information indicative of at least one artificial intelligence or machine learning pipeline phase to which said trustworthiness technical robustness capability information request relates, and said at least one second artificial intelligence or machine learning model technical robustness related parameter includes at least one capability entry, wherein each respective capability entry of said at least one capability entry includes at least one of second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates,
concept drift adaptation information indicative of at least one concept drift adaptation method supported for said at least one artificial intelligence or machine learning pipeline phase of said artificial intelligence or machine learning pipeline to which said respective capability entry relates,
event information indicative of at least one artificial intelligence or machine learning technical robustness event supported for said at least one artificial intelligence or machine learning pipeline phase of said artificial intelligence or machine learning pipeline to which said respective capability entry relates,
artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, and
artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

Aspect 98. The apparatus according to aspect 95, wherein
said first artificial intelligence or machine learning trustworthiness related message is a trustworthiness technical robustness configuration request, and
said second artificial intelligence or machine learning trustworthiness related message is a trustworthiness technical robustness configuration response.

Aspect 99. The apparatus according to aspect 98, wherein
said at least one first artificial intelligence or machine learning model technical robustness related parameter includes at least one configuration entry, wherein each respective configuration entry of said at least one configuration entry includes at least one of
scope information indicative of an artificial intelligence or machine learning pipeline to which said respective configuration entry relates,
phase information indicative of at least one artificial intelligence or machine learning pipeline phase to which said respective configuration entry relates,
missing data handling information indicative of at least one missing data handling method demanded for said at least one artificial intelligence or machine learning pipeline phase of said artificial intelligence or machine learning pipeline to which said respective configuration entry relates,
concept drift detection information indicative of at least one concept drift detection method demanded for said at least one artificial intelligence or machine learning pipeline phase of said artificial intelligence or machine learning pipeline to which said respective configuration entry relates,
concept drift adaptation information indicative of at least one concept drift adaptation method demanded for said at least one artificial intelligence or machine learning pipeline phase of said artificial intelligence or machine learning pipeline to which said respective configuration entry relates,
artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, and
event trigger information indicative of at least one event trigger condition for triggering at least one artificial intelligence or machine learning technical robustness event.

Aspect 100. The apparatus according to aspect 98 or 99, wherein
said trustworthiness technical robustness configuration response includes information on an operational state and/or operational status of at least one configuration target of said trustworthiness technical robustness configuration request.

Aspect 101. The apparatus according to any of aspects 98 to 100, wherein
the at least one processor, with the at least one memory and the computer program code, being configured to cause the apparatus to perform:
receiving a third artificial intelligence or machine learning trustworthiness related message from said first network entity, and
transmitting a fourth artificial intelligence or machine learning trustworthiness related message towards said first network entity, wherein
said third artificial intelligence or machine learning trustworthiness related message is a trustworthiness technical robustness measurement configuration request, and
said fourth artificial intelligence or machine learning trustworthiness related message is a trustworthiness technical robustness measurement configuration response, wherein
said third artificial intelligence or machine learning trustworthiness related message is related to artificial intelligence or machine learning model technical robustness as said trustworthiness sub-factor,
said fourth artificial intelligence or machine learning trustworthiness related message is related to artificial intelligence or machine learning model technical robustness as said trustworthiness sub-factor,
said third artificial intelligence or machine learning trustworthiness related message comprises a third information element including at least one third artificial intelligence or machine learning model technical robustness related parameter, and
said fourth artificial intelligence or machine learning trustworthiness related message comprises a fourth information element including at least one fourth artificial intelligence or machine learning model technical robustness related parameter.

Aspect 102. The apparatus according to aspect 101, wherein
said at least one third artificial intelligence or machine learning model technical robustness related parameter includes at least one measurement configuration entry, wherein each respective measurement configuration entry of said at least one measurement configuration entry includes at least one of scope information indicative of an artificial intelligence or machine learning pipeline to which said respective measurement configuration entry relates, phase information indicative of at least one artificial intelligence or machine learning pipeline phase to which said respective measurement configuration entry relates, metrics information indicative of at least one artificial intelligence or machine learning technical robustness metric to be collected for said at least one artificial intelligence or machine learning pipeline phase of said artificial intelligence or machine learning pipeline to which said respective capability entry relates, schedule information indicative of at least one measurement collection schedule for said at least one artificial intelligence or machine learning pipeline phase of said artificial intelligence or machine learning pipeline to which said respective capability entry relates, and frequency information indicative of at least one measurement frequency for said at least one artificial intelligence or machine learning pipeline phase of said artificial intelligence or machine learning pipeline to which said respective capability entry relates.

Aspect 103. The apparatus according to aspect 95, wherein said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

Aspect 104. The apparatus according to aspect 103, wherein said at least one first artificial intelligence or machine learning model technical robustness related parameter includes at least one of scope information indicative of an artificial intelligence or machine learning pipeline to which said trustworthiness technical robustness report request relates, phase information indicative of at least one artificial intelligence or machine learning pipeline phase to which said trustworthiness technical robustness report request relates, a list indicative of technical robustness metrics demanded to be reported, start time information indicative of a begin of a timeframe for which reporting is demanded with said trustworthiness technical robustness report request, and stop time information indicative of an end of said timeframe for which reporting is demanded with said trustworthiness technical robustness report request, and said at least one second artificial intelligence or machine learning model technical robustness related parameter includes demanded technical robustness metrics.

Aspect 105. The apparatus according to aspect 95, wherein said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

Aspect 106. The apparatus according to aspect 105, wherein said at least one first artificial intelligence or machine learning model technical robustness related parameter includes at least one of scope information indicative of an artificial intelligence or machine learning pipeline to which said trustworthiness technical robustness subscription relates, phase information indicative of at least one artificial intelligence or machine learning pipeline phase to which said trustworthiness technical robustness subscription relates, a list indicative of technical robustness metrics demanded to be reported, and technical robustness metrics filter information indicative of a filter to by applied to said technical robustness metrics demanded to be reported, and said at least one second artificial intelligence or machine learning model technical robustness related parameter includes demanded technical robustness metrics.

Aspect 107. The apparatus according to aspect 95, wherein said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

Aspect 108. The apparatus according to aspect 107, wherein said trustworthiness technical robustness event notification includes information on a triggered configured artificial intelligence or machine learning technical robustness event.

Aspect 109. A computer program product comprising computer-executable computer program code which, when the program is run on a computer, is configured to cause the computer to carry out the method according to any one of aspects 1 to 27, or 28 to 54.

Aspect 110. The computer program product according to aspect 109, wherein the computer program product comprises a computer-readable medium on which the computer-executable computer program code is stored, and/or wherein the program is directly loadable into an internal memory of the computer or a processor thereof.

The invention claimed is:

1. A method of a first network entity managing artificial intelligence or machine learning trustworthiness in a network, the method comprising transmitting a first artificial intelligence or machine learning trustworthiness related message towards a second network entity managing artificial intelligence or machine learning trustworthiness in an artificial intelligence or machine learning pipeline in said network, and receiving a second artificial intelligence or machine learning trustworthiness related message from said second network entity, wherein said first artificial intelligence or machine learning trustworthiness related message includes at least one criterion related to an artificial intelligence or machine learning trustworthiness aspect, and said artificial intelligence or machine learning trustworthiness aspect is a trustworthiness factor of artificial intelligence or machine learning model robustness configured to prevent extraction attacks.

2. The method according to claim 1, wherein said artificial intelligence or machine learning trustworthiness aspect is further one trustworthiness factor of artificial intelligence or machine learning model fairness and artificial intelligence or machine learning model explainability.

3. The method according to claim 1, wherein said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

4. The method according to claim 3, wherein said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

5. The method according to claim 4, wherein said at least one first artificial intelligence or machine learning model technical robustness related parameter includes at least one of first scope information indicative of at least one artificial intelligence or machine learning pipeline to which said trustworthiness technical robustness capability information request relates, or first phase information indicative of at least one artificial intelligence or machine learning pipeline phase to which said trustworthiness technical robustness capability information request relates; and said at least one second artificial intelligence or machine learning model technical robustness related parameter includes at least one capability entry, wherein each respective capability entry of said at least one capability entry includes at least one of second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, or artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

6. The method according to claim 3, wherein said first artificial intelligence or machine learning trustworthiness related message is a trustworthiness technical robustness configuration request, and said second artificial intelligence or machine learning trustworthiness related message is a trustworthiness technical robustness configuration response.

7. The method according to claim 6, wherein said at least one first artificial intelligence or machine learning model technical robustness related parameter includes at least one configuration entry, wherein each respective configuration entry of said at least one configuration entry includes at least one of scope information indicative of an artificial intelligence or machine learning pipeline to which said respective configuration entry relates, phase information indicative of at least one artificial intelligence or machine learning pipeline phase to which said respective configuration entry relates, missing data handling information indicative of at least one missing data handling method demanded for said at least one artificial intelligence or machine learning pipeline phase of said artificial intelligence or machine learning pipeline to which said respective configuration entry relates, concept drift detection information indicative of at least one concept drift detection method demanded for said at least one artificial intelligence or machine learning pipeline phase of said artificial intelligence or machine learning pipeline to which said respective configuration entry relates, concept drift adaptation information indicative of at least one concept drift adaptation method demanded for said at least one artificial intelligence or machine learning pipeline phase of said artificial intelligence or machine learning pipeline to which said respective configuration entry relates, artificial intelligence or machine learning technical robustness method information indicative of at least one artificial intelligence or machine learning technical robustness method demanded for said at least one artificial intelligence or machine learning pipeline phase of said artificial intelligence or machine learning pipeline to which said respective configuration entry relates, or event trigger information indicative of at least one event trigger condition for triggering at least one artificial intelligence or machine learning technical robustness event.

8. The method according to claim 3, wherein said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

9. The method according to claim 3, wherein said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

10. The method according to claim 3, wherein said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

11. A method of a second network entity managing artificial intelligence or machine learning trustworthiness in an artificial intelligence or machine learning pipeline in a network, the method comprising receiving a first artificial intelligence or machine learning trustworthiness related message from a first network entity managing artificial intelligence or machine learning trustworthiness in said network, and transmitting a second artificial intelligence or machine learning trustworthiness related message towards said first network entity, wherein said first artificial intelligence or machine learning trustworthiness related message includes at least one criterion related to an artificial intelligence or machine learning trustworthiness aspect, and said artificial intelligence or machine learning trustworthiness aspect is a trustworthiness factor of artificial intelligence or machine learning model robustness configured to prevent extraction attacks.

12. The method according to claim 11, wherein said artificial intelligence or machine learning trustworthiness aspect is further one trustworthiness factor of artificial intelligence or machine learning model fairness and artificial intelligence or machine learning model explainability.

13. The method according to claim 11, wherein said first artificial intelligence or machine learning trustworthiness related message is related to artificial intelligence or machine learning model technical robustness as a trustworthiness sub-factor, said second artificial intelligence or machine learning trustworthiness related message is related to artificial intelligence or machine learning model technical robustness as said trustworthiness sub-factor, and said first artificial intelligence or machine learning trustworthiness related message comprises a first information element including at least one first artificial intelligence or machine learning model technical robustness related parameter.

14. The method according to claim 13, wherein said first artificial intelligence or machine learning trustworthiness related message is a trustworthiness technical robustness capability information request, and said second artificial intelligence or machine learning trustworthiness related message is a trustworthiness technical robustness capability information response, and said second artificial intelligence or machine learning trustworthiness related message comprises a second information element including at least one second artificial intelligence or machine learning model technical robustness related parameter.

15. The method according to claim 14, wherein said at least one first artificial intelligence or machine learning model technical robustness related parameter includes at least one of first scope information indicative of at least one artificial intelligence or machine learning pipeline to which said trustworthiness technical robustness capability information request relates, or first phase information indicative of at least one artificial intelligence or machine learning pipeline phase to which said trustworthiness technical robustness capability information request relates; and said at least one second artificial intelligence or machine learning model technical robustness related parameter includes at least one capability entry, wherein each respective capability entry of said at least one capability entry includes at least one of second scope information indicative of an artificial intelligence or machine learning pipeline to which said respective capability entry relates, second phase information indicative of at least one artificial intelligence or machine learning pipeline phase to which said respective capability entry relates, missing data handling information indicative of at least one missing data handling method supported for said at least one artificial intelligence or machine learning pipeline phase of said artificial intelligence or machine learning pipeline to which said respective capability entry relates, missing data metrics information indicative of at least one missing data metric supported for said at least one artificial intelligence or machine learning pipeline phase of said artificial intelligence or machine learning pipeline to which said respective capability entry relates, concept drift detection information indicative of at least one concept drift detection method supported for said at least one artificial intelligence or machine learning pipeline phase of said artificial intelligence or machine learning pipeline to which said respective capability entry relates, concept drift metrics information indicative of at least one concept drift metric supported for said at least one artificial intelligence or machine learning pipeline phase of said artificial intelligence or machine learning pipeline to which said respective capability entry relates, concept drift adaptation information indicative of at least one concept drift adaptation method supported for said at least one artificial intelligence or machine learning pipeline phase of said artificial intelligence or machine learning pipeline to which said respective capability entry relates, event information indicative of at least one artificial intelligence or machine learning technical robustness event supported for said at least one artificial intelligence or machine learning pipeline phase of said artificial intelligence or machine learning pipeline to which said respective capability entry relates, artificial intelligence or machine learning technical robustness method information indicative of at least one artificial intelligence or machine learning technical robustness method supported for said at least one artificial intelligence or machine learning pipeline phase of said artificial intelligence or machine learning pipeline to which said respective capability entry relates, or artificial intelligence or machine learning technical robustness metrics information indicative of at least one artificial intelligence or machine learning technical robustness metric supported for said at least one artificial intelligence or machine learning pipeline phase of said artificial intelligence or machine learning pipeline to which said respective capability entry relates.

16. The method according to claim 13, wherein said first artificial intelligence or machine learning trustworthiness related message is a trustworthiness technical robustness configuration request, and said second artificial intelligence or machine learning trustworthiness related message is a trustworthiness technical robustness configuration response.

17. The method according to claim 16, further comprising receiving a third artificial intelligence or machine learning trustworthiness related message from said first network entity, and transmitting a fourth artificial intelligence or machine learning trustworthiness related message towards said first network entity, wherein said third artificial intelligence or machine learning trustworthiness related message is a trustworthiness technical robustness measurement configuration request, and said fourth artificial intelligence or machine learning trustworthiness related message is a trustworthiness technical robustness measurement configuration response, wherein said third artificial intelligence or machine learning trustworthiness related message is related to artificial intelligence or machine learning model technical robustness as said trustworthiness sub-factor, said fourth artificial intelligence or machine learning trustworthiness related message is related to artificial intelligence or machine learning model technical robustness as said trustworthiness sub-factor, said third artificial intelligence or machine learning trustworthiness related message comprises a third information element including at least one third artificial intelligence or machine learning model technical robustness related parameter, and said fourth artificial intelligence or machine learning trustworthiness related message comprises a fourth information element including at least one fourth artificial intelligence or machine learning model technical robustness related parameter.

18. The method according to claim 13, wherein said first artificial intelligence or machine learning trustworthiness related message is a trustworthiness technical robustness report request, and said second artificial intelligence or machine learning trustworthiness related message is a trustworthiness technical robustness report response, and said second artificial intelligence or machine learning trustworthiness related message comprises a second information element including at least one second artificial intelligence or machine learning model technical robustness related parameter.

19. The method according to claim 13, wherein said first artificial intelligence or machine learning trustworthiness related message is a trustworthiness technical robustness subscription, said second artificial intelligence or machine learning trustworthiness related message is a trustworthiness technical robustness notification, and said second artificial intelligence or machine learning trustworthiness related message comprises a second information element including at least one second artificial intelligence or machine learning model technical robustness related parameter.

20. The method according to claim 13, wherein said first artificial intelligence or machine learning trustworthiness related message is a trustworthiness technical robustness event subscription for subscribing to any triggered configured artificial intelligence or machine learning technical robustness event, and said second artificial intelligence or machine learning trustworthiness related message is a trustworthiness technical robustness event notification.

\* \* \* \* \*